United States Patent
Suzuki et al.

(10) Patent No.: US 8,957,613 B2
(45) Date of Patent: Feb. 17, 2015

(54) CONTROL DEVICE FOR AC MOTOR

(71) Applicant: Denso Corporation, Kariya, Aichi-pref. (JP)

(72) Inventors: Takashi Suzuki, Anjo (JP); Hirofumi Kako, Chita-gun (JP); Takeshi Itoh, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/039,273

(22) Filed: Sep. 27, 2013

(65) Prior Publication Data

US 2014/0091740 A1    Apr. 3, 2014

(30) Foreign Application Priority Data

Sep. 28, 2012    (JP) .................................. 2012-217936

(51) Int. Cl.

| | |
|---|---|
| *H02P 21/00* | (2006.01) |
| *H02H 7/08* | (2006.01) |
| *H02H 7/09* | (2006.01) |
| *H02P 21/14* | (2006.01) |
| *H02P 29/02* | (2006.01) |

(52) U.S. Cl.
CPC ............ *H02P 21/146* (2013.01); *H02P 29/027* (2013.01); *H02P 21/0035* (2013.01); *H02P 21/14* (2013.01)
USPC ............. 318/400.02; 318/400.21; 318/400.22

(58) Field of Classification Search
CPC ............... H02P 6/12; H02P 6/14; H02P 6/16; H02P 6/002; H02P 29/02
USPC .......................... 318/400.02, 400.21, 400.22
See application file for complete search history.

(56) References Cited

U.S. PATENT DOCUMENTS 6,229,719 B1    5/2001  Sakai et al.
6,828,744 B2 *  12/2004  Na ................................. 318/432
(Continued)

FOREIGN PATENT DOCUMENTS

| JP | 06-253585 | 9/1994 |
|---|---|---|
| JP | 2004-159398 | 6/2004 |
| JP | B-4942425 | 3/2012 |

OTHER PUBLICATIONS

Suzuki, et al., U.S. Appl. No. 14/039,248, filed Sep. 27, 2013.
(Continued)

*Primary Examiner* — Eduardo Colon Santana
*Assistant Examiner* — Gabriel Agared
(74) *Attorney, Agent, or Firm* — Nixon & Vanderhye P.C.

(57) ABSTRACT

A control device for a three-phase alternate current motor, includes: a control phase current acquisition means; a monitor phase current acquisition means; a rotation angle acquisition means; a two-phase control current value current calculation means; a one-phase current estimated value estimation means; a voltage command value calculation means; an other phase current estimation means for calculating a monitor or a control phase current estimated value; an abnormality detection means for detecting an abnormality in a monitor phase or a control phase current sensor; and a switching means for switching between a monitoring stop mode, in which the voltage command value is calculated based on the two-phase control current value, and a monitoring mode, in which the voltage command value is calculated based on the one-phase current estimated value, and the abnormality detection means detects the abnormality, at predetermined time intervals.

14 Claims, 22 Drawing Sheets

(56) References Cited

U.S. PATENT DOCUMENTS

| | | | |
|---|---|---|---|
| 7,208,903 B2* | 4/2007 | Nakai et al. | 318/609 |
| 2003/0227271 A1* | 12/2003 | Shindo | 318/439 |
| 2006/0145652 A1* | 7/2006 | Ta et al. | 318/807 |
| 2008/0079385 A1 | 4/2008 | Hashimoto et al. | |
| 2008/0252242 A1* | 10/2008 | Akama et al. | 318/400.14 |
| 2009/0133947 A1* | 5/2009 | Yoshihara et al. | 180/65.285 |
| 2011/0080127 A1* | 4/2011 | Akama et al. | 318/400.21 |
| 2012/0001574 A1* | 1/2012 | Akaishi et al. | 318/400.04 |
| 2012/0217923 A1* | 8/2012 | Wu et al. | 318/610 |
| 2012/0250370 A1* | 10/2012 | Taniguchi et al. | 363/34 |

OTHER PUBLICATIONS

Suzuki, et al., U.S. Appl. No. 14/039,255, filed Sep. 27, 2013.
Suzuki, et al., U.S. Appl. No. 14/039,262, filed Sep. 27, 2013.

* cited by examiner

CONTROL DEVICE FOR AC MOTOR

CROSS REFERENCE TO RELATED APPLICATION

This application is based on Japanese Patent Application No. 2012-217936 filed on Sep. 28, 2012, the disclosure of which is incorporated herein by reference.

TECHNICAL FIELD

The present disclosure relates to, a control device for an AC motor.

BACKGROUND

In recent years, from the social requirement of lower fuel consumption and less exhaust emission, an electric automobile and a hybrid automobile, each of which is mounted with an AC motor as a power source of a vehicle, is drawing attention. For example, in some of the hybrid automobiles, a DC power source made of a secondary battery or the like and an AC motor are connected to each other via an electric power conversion device constructed of an inverter and the like, and the DC voltage of the DC power source is converted into AC voltage by the inverter to thereby drive the AC motor.

Further, in the case where an AC motor is mounted in an electric vehicle and the like, from the viewpoint of failsafe, it is desired that an abnormality caused in a current sensor and the like can be detected. For example, in the patent document 1, in the case where the total sum of the current values of three phases sensed by current sensors disposed for three phases does not become 0, an abnormality of a current control loop is assumed to be detected.

Still further, the patent document 2 discloses the following technique: an ideal current signal is calculated by acquiring an ideal AC waveform based on a current value of one phase and is compared with three-phase current signals; and in the case where an error between them is not smaller than a specified value, the ideal current signal is assumed to be abnormal.

In the case where the current sensors are disposed for the respective phases like the patent document 1, it is thought that, for example, the drive of the AC motor is controlled on the basis of the current sensed values of two phases and an abnormality of the current sensor is detected on the basis of the current sensed value of the remaining one phase. At this time, the current sensor for controlling the drive of the AC motor (hereinafter referred to as "current sensor for controlling") and the current sensor for detecting an abnormality of the current sensor (hereinafter referred to as "current sensor for monitoring") need to be clearly differentiated from each other. This is because of the following reason: in a system the current sensed value is fed back in such a way as to become equal to a desired sine wave current (for example, the main motor of an electric vehicle), all current sensed values sensed by the current sensors for controlling are controlled precisely in such a way as to become a desired sine wave current, so that when the current sensed value of the current sensor for controlling is used for the abnormality of the current sensor, it looks like as if an abnormality were not caused in the current sensor. This is referred to as "the interference of current feedback".

In order to prevent the interference of current feedback, at least at the time of detecting an abnormality of the current sensor, the current sensor for monitoring needs to be entirely independent of a feedback loop. To this end, the current sensor for controlling, which is provided for the purpose of controlling the drive of an AC motor, needs to be clearly differentiated from the current sensor for monitoring. In this case, even in a system in which high-speed sampling and high-speed feedback control are performed, a detected value for detecting an abnormality of the current sensor for monitoring is outside the current feedback control and hence is allowed to be detected at a lower sampling speed without being restricted by the control speed. For example, the sampling period of the current sensor for controlling, which is used for the current feedback control, is several hundreds µsec, whereas the sampling period of the current sensor for monitoring is several msec.

On the other hand, even if the sampling speed of the current sensor for monitoring is allowed to be low, seeing that an abnormality of the current sensor is detected by the comparison or combination of the sensed value of the current sensor for monitoring and the sensed value of the current sensor for controlling, if the current sensor for controlling and the current sensor for monitoring are different from each other in performance such as detection accuracy, failure rate, and temperature characteristics, the detection accuracy of an abnormality is likely to be impaired. For this reason, there is no alternative but to use the current sensor for monitoring of the same quality as the current sensor for controlling, so that the current sensor for monitoring and the current sensor for controlling are equal to each other in size and cost. Hence, this prevents the request of reducing size and cost from being satisfied.

Further, in the patent document 2, by the use of the AC waveforms of respective phases being ideally shifted by 120°, one-phase current value is delayed by 120° in such a way as to correspond with the ideal AC waveform, whereby the current values of the other phases is estimated. The patent document 2 is a technology of questioning only a gain error between two current sensors and of focusing attention on the fact that a gain error cannot be caused by shifting only a phase in the current sensed value of one phase. An ideal current signal acquired by this method is not information reflecting actual respective currents with high accuracy and hence an abnormality of the current sensor cannot be suitably detected. Further, in the detection of an abnormality in the patent document 2, the interference of current feedback is not considered. Further, at least at the time of detecting an abnormality, it is necessary to bring about the state where the current sensor for controlling is clearly differentiated from the current sensor for monitoring. However, the patent document 2 makes no reference to these points and hence, according to the technique of the patent document 2, it is highly probable that an abnormality of the current sensor cannot be suitably detected.

[Patent document 1] Japanese Unexamined Patent Publication No. Hei 06-253585
[Patent document 2] Japanese Patent No. 4942425

SUMMARY

It is an object of the present disclosure to provide a control device for an AC motor that has current sensors for two phases and that can suitably detect an abnormality of the current sensor of the AC motor.

According to an aspect of the present disclosure, a control device for controlling and driving a three-phase alternate current motor, which has an impressed voltage controlled by an inverter, includes: a control phase current acquisition means for acquiring a control phase current sensed value from a control phase current sensor, which is disposed on a control phase as one of three phases of the alternate current motor; a monitor phase current acquisition means for acquiring a monitor phase current sensed value from a monitor phase current sensor, which is disposed on a monitor phase as another one of the three phases different from the control phase; a rotation angle acquisition means for acquiring a rotation angle sensed value from a rotation angle sensor for sensing a rotation angle of the alternate current motor; a current calculation means for calculating a two-phase control current value based on the control phase current sensed value, the monitor phase current sensed value and the rotation angle sensed value; a current estimation means for calculating a one-phase current estimated value for controlling the alternate current motor based on the control phase current sensed value and the rotation angle sensed value; a voltage command value calculation means for calculating a voltage command value relating to a voltage to be impressed on the inverter based on the two-phase control current value or the one phase current estimated value for controlling the alternate current motor; an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on the monitor phase current estimated value and the rotation angle sensed value; an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value; and a switching means for switching between a monitoring stop mode, in which the voltage command value is calculated based on the two-phase control current value, and a monitoring mode, in which the voltage command value is calculated based on the one-phase current estimated value for controlling the alternate current motor, and the abnormality detection means detects the abnormality, at predetermined time intervals.

The above control device has the abnormality detection means and hence can suitably detect an abnormality being caused in at least one of the control phase current sensor and the monitor phase current sensor. Further, the above device focuses attention on the fact that a detected value for detecting an abnormality does need to be constantly detected and has the current sensor disposed for two phases of three phases. The monitoring stop mode and the monitoring mode are switched from each other at specified intervals, the monitoring stop mode calculating the voltage command value by the use of the two-phase control current values based on the current sensed values of two phases of the control phase and the monitor phase, the monitoring mode calculating the voltage command value by the use of the one-phase current estimated value for controlling, which is based on the current sensed value of one phase of the control phase, and detecting an abnormality of the control phase current sensor and the monitor phase current sensor.

In other words, the above device performs the current feedback control at high speed and with high accuracy by the use of two-phase control current values based on the current sensed values of two phases in the monitoring stop mode and switches the monitoring stop mode to the monitoring mode at specified intervals. The above device does not use the monitor phase current sensed value for the current feedback control in the monitoring mode and performs the current feedback control by the use of the one-phase current estimated values for controlling to thereby prevent the current feedback control from interfering with the monitor phase current sensed value and detects an abnormality of the current sensor.

The above device detects an abnormality of the control phase current sensor and the monitor phase current sensor on the basis of the comparison result of the current estimated value and the current sensed value. One of the current sensed value and the current estimated value to be compared with each other is the monitor phase current sensed value itself, which is not used for the current feedback control, or the value based on the monitor phase current sensed value and hence is not affected by the interference of current feedback control, which hence makes it possible to suitably detect an abnormality of the current sensor. In addition, two requirements of control performance and abnormality detection can be achieved by a minimum number of current sensors. Further, the current sensor for monitoring, which is used for detecting an abnormality of the current sensor, does not need to be disposed for one independent phase. Hence, when compared with the case where a current sensor for monitoring is disposed for one independent phase, a reduction in size and cost can be achieved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, a control device of an AC motor control for controlling the drive of an AC motor according to the present disclosure will be described with reference to the drawings. Hereinafter, in a plurality of embodiments, the substantially same constructions are denoted by the same reference symbols and their descriptions will be omitted.

First Embodiment

Figure 1:
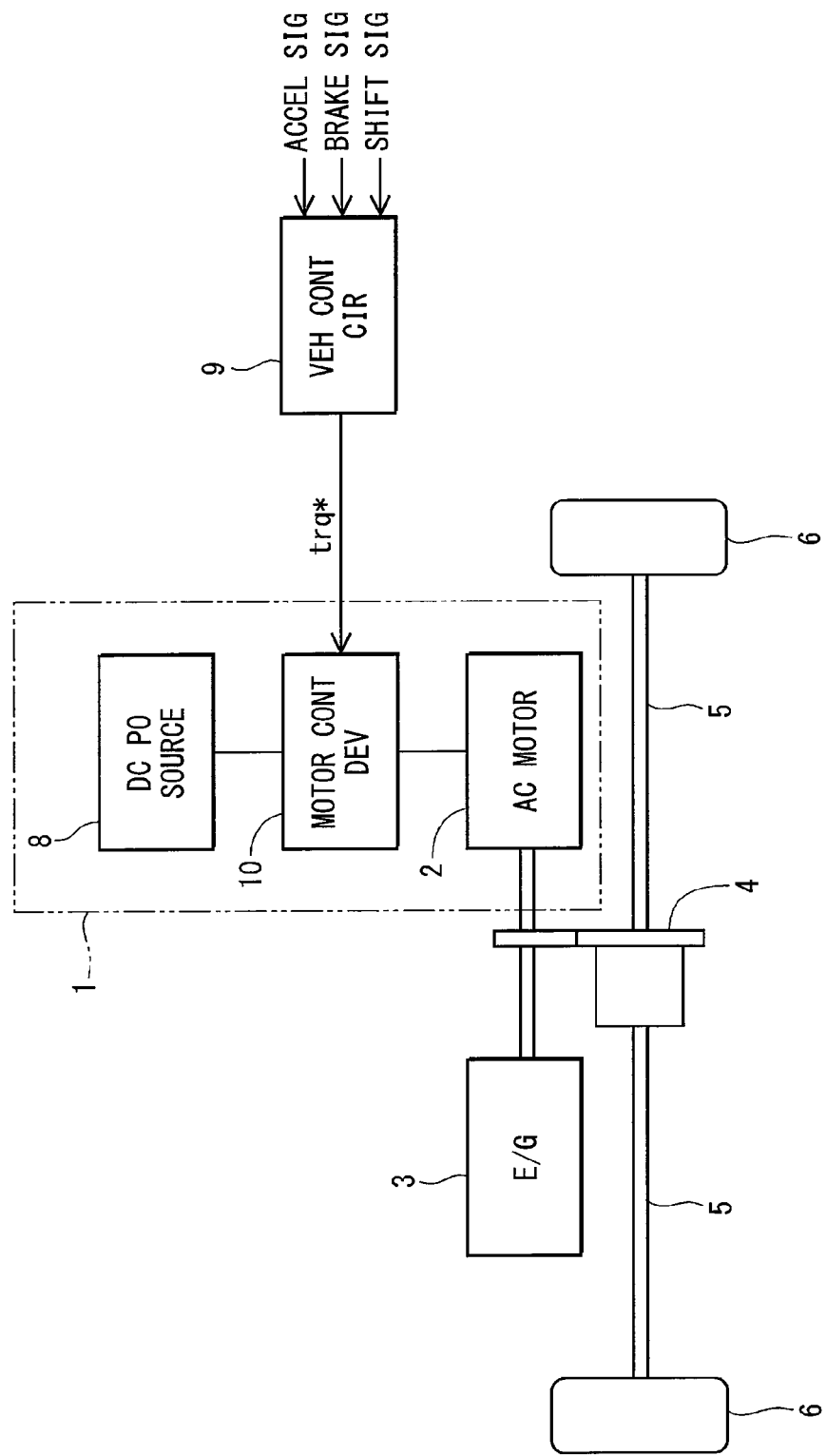
FIG. 1 is a schematic view to show a construction of an electric motor drive system of a first embodiment of the present disclosure.

As shown in FIG. 1, an electric motor control device 10 as a control device of an AC motor 2 according to a first embodiment of the present disclosure is applied to an electric motor drive system 1 for driving an electric vehicle.

The electric motor drive system 1 includes the AC motor 2, a DC power source 8, the electric motor control device 10, and the like.

The AC motor 2 is, for example, an electric motor for generating torque for driving the driving wheels 6 of the electric vehicle. The AC motor 2 of the present embodiment is a three-phase permanent-magnet type synchronous motor.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator having a function as an electric motor that generates torque for driving the driving wheels 6 and a function as a generator that is driven by the engine 3 and that can generate electricity.

The AC motor 2 is coupled to an axle 5 via a gear 4. In this way, the torque generated by the drive of the AC motor 2 rotates the axle 5 via the gear 4 to thereby drive the driving wheels 6.

The DC power source 8 is an electric storage device that can charge and discharge, for example, a secondary battery such as a nickel metal hydride battery or a lithium ion battery, and an electric double-layer capacitor. The DC power source 8 is connected to an inverter 11 (see FIG. 2) of the electric motor control device 10, that is, the DC power source 8 is so constructed as to supply electricity to the AC motor 2 and to be supplied with electricity from the AC motor 2 via the inverter 11.

A vehicle control circuit 9 is constructed of a microcomputer and the like and is provided with a CPU, a ROM, an I/O and a bass line for connecting these constructions, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not in the drawings. Further, the vehicle control circuit 9 detects a driving state of the vehicle on the basis of the acquired signals and outputs a torque command value trq* responsive to the driving state to the electric motor control device 10. Still further, the vehicle control circuit 9 outputs a command signal to an engine control circuit (not shown) for controlling the drive of the engine 3.

Figure 2:
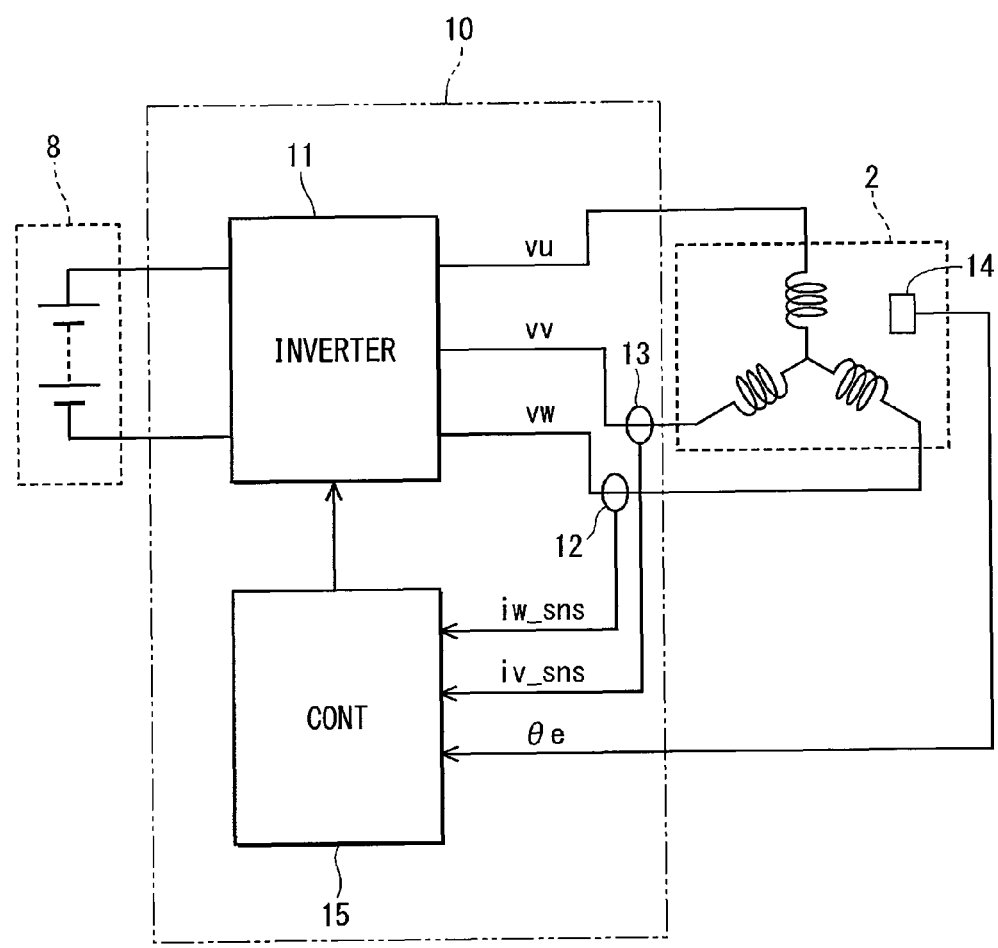
FIG. 2 is a schematic view to show a construction of an electric motor control device of the first embodiment of the present disclosure.

As shown in FIG. 2, the electric motor control device 10 is provided with the inverter 11 and a control section 15.

The inverter 11 has a system voltage VH impressed thereon according to the driving state of the AC motor 2, a vehicle request, and the like, the system voltage VH being a voltage to which the DC voltage of the DC power source 8 is boosted up by a boost converter (not shown). Further, the inverter 11 has six switching elements (not shown) connected in bridge mode. As to the switching element, for example, an IGBT (Insulated Gate Bipolar Transistor), a MOS (Metal Oxide Semiconductor) transistor, and a bipolar transistor can be used for the switching elements. The switching element is switched on/off on the basis of voltage command values vu*, vw*, and vw* outputted from an inverse dq transformation part 23 of the control section 15. In this way, the inverter 11 controls three-phase AC voltages vu, vv, vw to be impressed on the AC motor 2. The AC motor 2 has its drive controlled by the three-phase AC voltages vu, w, vw impressed thereon, the three phase AC voltages vu, vv, vw being generated by the inverter 11.

Here, the drive control of the AC motor 2 will be described. According to the number of revolutions N of the AC motor 2, which is based on an electric angle θe sensed by a rotation angle sensor 14, and the torque command value trq* from the vehicle control circuit 9, the electric motor control device 10 drives the AC motor 2 as an electric motor to perform a powering operation, thereby consuming electricity, or drives the AC motor 2 as a generator to perform a regenerating operation, thereby generating electricity. Specifically, according to the number of revolutions N and to whether the command value trq* is positive or negative, the electric motor control device 10 switches the operation of the AC motor 2 into the following four patterns:

<1. Normal rotation powering operation> when the number of revolutions N is positive and the torque command trq* is positive, the AC motor 2 consumes electricity;

<2. Normal rotation regenerating operation> when the number of revolutions N is positive and the torque command trq* is negative, the AC motor 2 generates electricity;

<3. Reverse rotation powering operation> when the number of revolutions N is negative and the torque command trq* is negative, the AC motor 2 consumes electricity; and <4. Reverse rotation regenerating operation> when the number of revolutions N is negative and the torque command trq* is positive, the AC motor 2 generates electricity.

In the case where the number of revolutions N>0 (normal rotation) and the torque command trq*>0, or the number of revolutions N<0 (reverse rotation) and the torque command trq*<0, the inverter 11 converts the DC electricity supplied from the DC power source 8 to AC electricity by the switching operation of the switching element to thereby drive the AC motor 2 in such a way as to output torque (perform a powering operation).

On the other hand, in the case where the number of revolutions N>0 (normal rotation) and the torque command trq*<0, or the number of revolutions N<0 (reverse rotation) and the torque command trq*>0, the inverter 11 converts the AC electricity generated by the AC motor 2 to DC electricity by the switching operation of the switching elements to thereby supply the DC electricity to the DC power source 8, whereby the AC motor 2 performs a regenerating operation.

A control phase current sensor 12 is disposed on any one phase of the AC motor 2. In the present embodiment, the control phase current sensor 12 is disposed on W phase. That is, in the present embodiment, the W phase corresponds to "a control phase". The control phase current sensor 12 senses a control phase current sensed value iw_sns, which is to be passed to the W phase of the control phase, and outputs the control phase current sensed value iw_sns to the control section 15.

A monitor phase current sensor 13 is disposed on one phase different from the control phase of the AC motor 2. In the present embodiment, the monitor phase current sensor 13 is disposed on V phase. That is, in the present embodiment, the V phase corresponds to "a monitor phase". The monitor phase current sensor 13 senses a monitor phase current sensed value iv_sns, which is to be passed to the V phase of the monitor phase, and outputs the monitor phase current sensed value iv_sns to the control section 15.

In the present embodiment, each of the control phase current sensor 12 and the monitor phase current sensor 13 senses voltage to be impressed on the corresponding phase and senses current on the basis of the sensed voltage. However, any construction can be employed in which the control phase current sensed value iw_sns and the monitor phase current sensed value iv_sns can be acquired by the control section 15. Further, in the present embodiment, the control phase is made the W phase and the monitor phase is made the V phase. However, if the control phase and the monitor phase are different from each other, any phase may be made the control phase or the monitor phase.

The rotation angle sensor 14 is disposed near a rotor (not shown) of the AC motor 2 and senses an electric angle θe and outputs the sensed electric angle θe to the control section 15. Further, the number of revolutions N of the rotor of the AC motor 2 (hereinafter, as required, simply referred to as "the number of revolutions N of the AC motor 2") is calculated on the basis of the electric angle θe sensed by the rotation angle sensor 14. The rotation angle sensor 14 of the present embodiment is a resolver. In addition, the rotation angle sensor 14 may be an other kind of sensor such as a rotary encoder.

The control section 15 is constructed of a microcomputer and the like and is provided with a CPU, a ROM, an I/O and a bus line for connecting these constructions, all of which are not shown in the drawings. The control section 15 controls the operation of the AC motor 2 by software processing, which is performed by executing previously stored programs by the CPU, and by hardware processing, which is performed by a dedicated electronic circuit.

Figure 3:
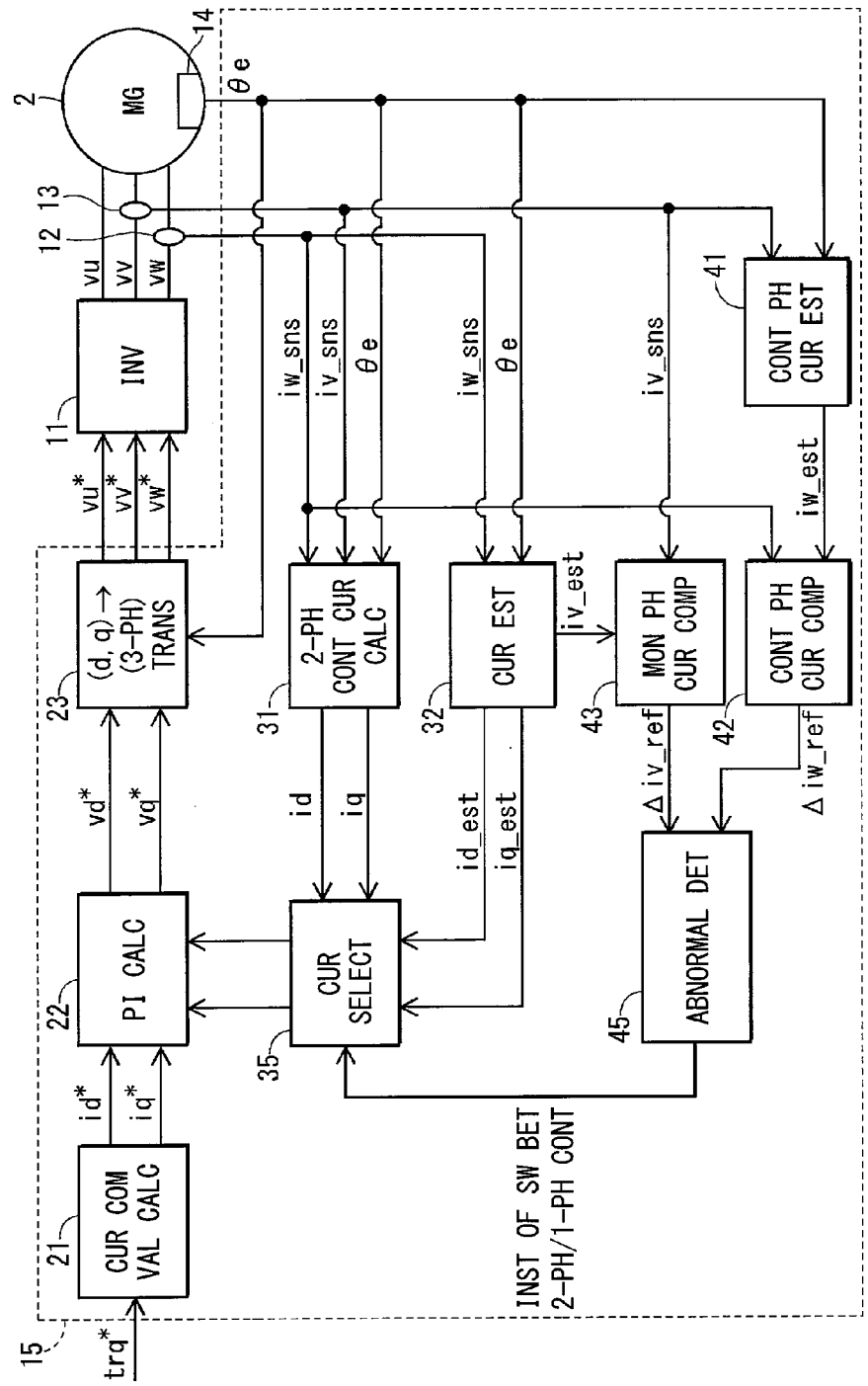
FIG. 3 is a block diagram to show the construction of the electric motor control device of the first embodiment of the present disclosure.

As shown in FIG. 3, the control section 15 includes a current command value calculation part 21, a PI calculation part 22, an inverse dq transformation part 23, a two-phase control current calculation part 31, a current estimation part 32, a current selection part 35, a control phase current estimation part 41, a control phase current comparison part 42, a monitor phase current comparison part 43, and an abnormality determination part 45.

The current command value calculation part 21 calculates a d-axis current command value id* and a q-axis current command value iq* in a rotating coordinate system ((d, q) coordinate system) set as the rotating coordinates of the AC motor 2 on the basis of the torque command value trq* acquired from the vehicle control circuit 9. In the present embodiment, the d-axis current command value id* and the q-axis current command value iq* are calculated with reference to a previously stored map but may be calculated by a mathematical equation or the like.

The PI calculation part 22 calculates a d-axis voltage command value vd* and a q-axis voltage command value vq*. In more detail, in order to make a d-axis current value id or a d-axis current estimated value id_est, which is fed back from the current selection part 35, follow the d-axis current command value id*, the PI calculation part 22 calculates the d-axis voltage command value vd* by PI calculation in such a way as to make the difference between the d-axis current command value id* and the d-axis current value id or the d-axis current estimated value id_est converge to 0. Similarly, in order to make a q-axis current value iq or a q-axis current estimated value iq_est, which is fed back from the current selection part 35, follow a q-axis current command value iq*, the PI calculation part 22 calculates the q-axis voltage command value vq* by PI calculation in such a way as to make the difference between the q-axis current command value iq* and the q-axis current value iq or the q-axis current estimated value iq_est converge to 0.

The inverse dq transformation part 23 inversely dq transforms the d-axis voltage command value vd* and the q-axis voltage command value vq* to a U– phase voltage command value vu*, a V– phase voltage command value w*, and a W– phase voltage command value vw* on the basis of the electric angle θe acquired from the rotation angle sensor 14.

The switching elements of the inverter 11 are switched on/off on the basis of the U– phase voltage command value vu*, the V– phase voltage command value vv*, and the W– phase voltage command value vw*. In this way, three-phase AC voltages vu, vv, vw are generated by the inverter 11, and the three-phase AC voltages vu, w, vw are impressed on the AC motor 2. In this way, the drive of the AC motor 2 is controlled in such a way as to output a torque responsive to the torque command value trq*. In the present embodiment, the three-phase AC voltages vu, vv vw correspond to "impressed voltages".

The two-phase control current calculation part 31 calculates the d-axis current value id and the q-axis current value iq by the dq transformation on the basis of the control phase current sensed value iw_sns, the monitor phase current sensed value iv_sns, and the electric angle θe. The two-phase control current calculation part 31 calculates the d-axis current value id and the q-axis current value iq on the basis of the control phase current sensed value iw_sns and the monitor phase current sensed value iv_sns, which are the current sensed values of two phases. Hence, the d-axis current value id and the q-axis current value iq, which are calculated here, are actual current values.

Here, a general equation of the dq transformation will be shown by a mathematical equation (1).

[Mathematical formula 1]

$$\begin{bmatrix} id \\ iq \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (1)$$

Further, when an equation (3) calculated by the Kirchhoff's law (see an equation (2)) is substituted into the equation (1), an equation (4) can be acquired.

[Mathematical formula 2]

$$iu + iv + iw = 0 \quad (2)$$

$$iu = -iv - iw \quad (3)$$

$$\begin{bmatrix} id \\ iq \end{bmatrix} = \sqrt{\frac{2}{3}} \begin{bmatrix} \cos(\theta e - 120°) - \cos(\theta e) & \cos(\theta e + 120°) - \cos(\theta e) \\ -\sin(\theta e - 120°) + \sin(\theta e) & -\sin(\theta e + 120°) + \sin(\theta e) \end{bmatrix} \quad (4)$$

$$\begin{bmatrix} iv\_sns \\ iw\_sns \end{bmatrix}$$

$$= \sqrt{\frac{2}{3}} \times \sqrt{3} \begin{bmatrix} -\cos(\theta e + 30°) & \cos(\theta e + 150°) \\ \sin(\theta e + 30°) & -\sin(\theta e + 150°) \end{bmatrix} \begin{bmatrix} iv\_sns \\ iw\_sns \end{bmatrix}$$

$$= \sqrt{2} \begin{bmatrix} -\sin(\theta e + 120°) & -\sin(\theta e + 60°) \\ -\cos(\theta e + 120°) & -\cos(\theta e + 60°) \end{bmatrix} \begin{bmatrix} iv\_sns \\ iw\_sns \end{bmatrix}$$

As shown by the equation (4), if the current values of two phases among three phases, the d-axis current value id and the q-axis current value iq can be calculated, so that the current value of the other phase (U phase in the present embodiment) does not need to be calculated.

The current estimation part 32 calculates a d-axis current estimated value id_est and a q-axis current estimated value iq_est and a monitor phase current estimated value iv_est on the basis of the control phase current sensed value iw_sns and the electric angle θe.

Figure 5:
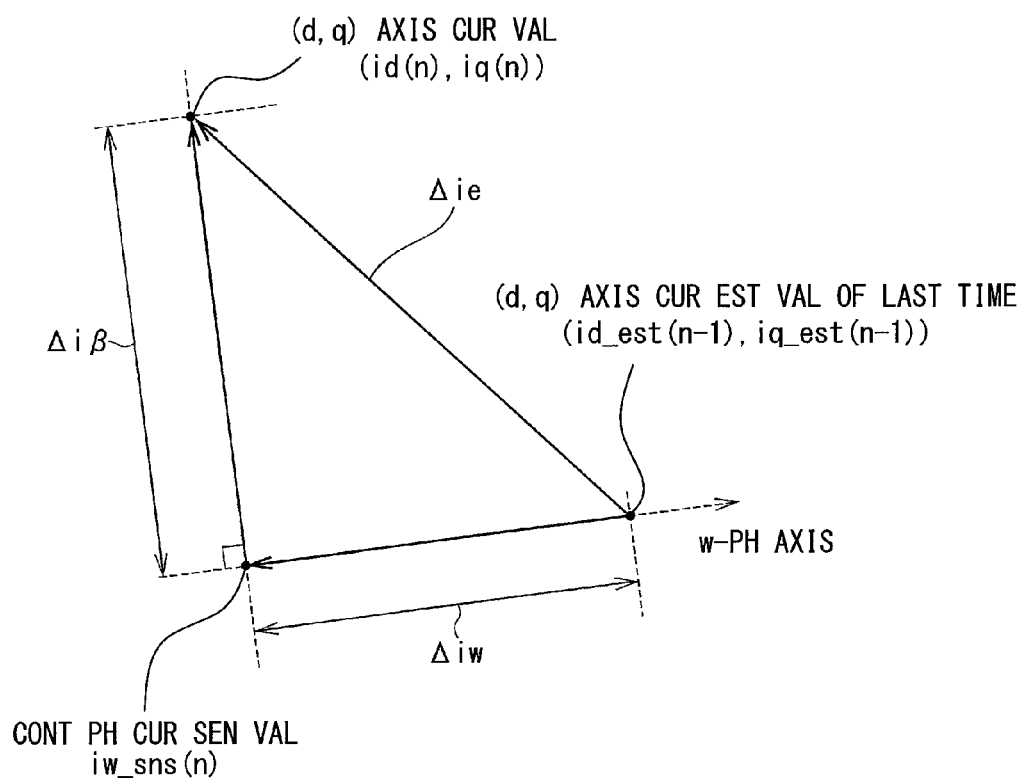
FIG. 5 is an illustration to illustrate a current estimation according to the first embodiment of the present disclosure.

That is, the current estimation part 32 estimates the d-axis current estimated value id_est and the q-axis current estimated value iq_est by the use of the control phase current sensed value iw_sns of one phase. As shown in FIG. 5, the d-axis current value id and the q-axis current value iq can be directly calculated by the use of the control phase current sensed value iw_sns and the monitor phase current sensed value iv_sns, which are the current sensed values of two phases. However, in the case where the d-axis current estimated value id_est and the q-axis current estimated value iq_est are calculated by the use of the control phase current sensed value iw_sns of one phase, a control phase estimated error Δiw, which is a W-phase component of an error vector Δie, can be calculated, but a β-axis estimated error Δiβ, which is a component perpendicular to the W phase, cannot be calculated.

Then, in the present embodiment, the current estimation part 32 integrates the control phase estimated error Δiw by the use of the W– phase axis relatively rotating on a (d, q) axis plane, which is a rotating coordinate system, to thereby make the d-axis current estimated value id_est and the q-axis current estimated value iq_est asymptotic to the d-axis current value id and the q-axis current value iq, respectively. In this way, the current estimation part 32 calculates the d-axis current estimated value id_est and the q-axis current estimated value iq_est with high accuracy on the basis of the control phase current sensed value iw_sns of one phase.

Figure 4:
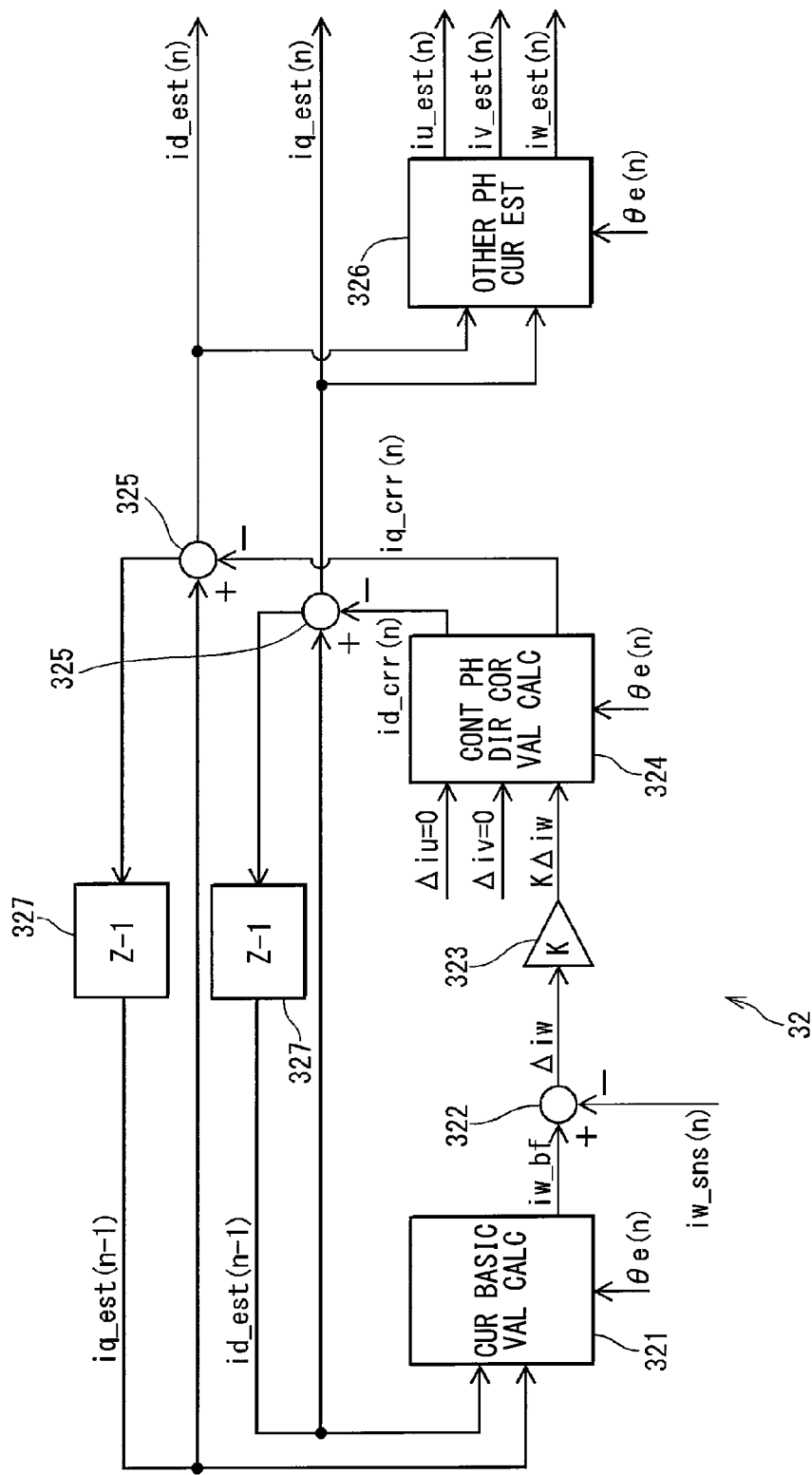
FIG. 4 is a block diagram to show a construction of a current estimation part of the first embodiment of the present disclosure.

As shown in FIG. 4, the current estimation part 32 has a current basic value calculation part 321, a subtractor 322, a gain correction part 323, a control phase direction correction value calculation part 324, subtractors 325, an other phase current estimation part 326, and delay elements 327. Here, when it is assumed that current estimation processing based on a current sensed value inputted this time is n-th processing and that a current sensed value of W phase and an electric angle, which are inputted this time, are "iw_sns (n)" and "θe (n)", the current estimated values acquired by the n-th processing are expressed by "i#_est (n)" (where # is d, q, u, v, w).

The current basic value calculation part 321 has a d-axis current estimated value id_est (n−1) and a q-axis current estimated value iq_est (n−1) inputted thereto, the d-axis current estimated value id_est (n−1) and the q-axis current estimated value iq_est (n−1) being calculated by the last calculation, that is, the (n−1)-th processing. The current basic value calculation part 321 inversely dq transforms the d-axis current estimated value id_est (n−1) and the q-axis current estimated value iq_est (n−1), which are calculated by the last calculation, by the use of the electric angle θe (n) to thereby calculate a current basic value iw_bf which is a W phase component.

The subtractor 322 calculates the control phase estimated error Δiw which is the difference between the current basic value iw_bf and the control phase current sensed value iw_sns (n).

The gain correction part 323 multiplies the control phase estimated error Δiw by a gain K to thereby calculate a corrected error KΔiw. Here, the gain K serves as a low pass filter (hereinafter referred to as "LPF"), which is set for the d-axis current estimated value id_est and the q-axis current estimated value iq_est, and moderates a change in the d-axis current estimated value id_est and the q-axis current estimated value iq_est (which will be later described in more detail). When it is assumed that the number of pieces of processing (time constant÷ processing cycle) in a desired time constant of the LPF is Klpf, the value of the gain K is expressed by 1/Klpf and is within a range of 0<K<1.

The control phase direction correction value calculation part 324 dq transforms the corrected error KΔiw by assuming that Δiu=0 and Δiv=0 to thereby calculate the control phase direction correction values id_crr (n) and iq_crr (n). In the present embodiment, the control phase direction correction values id_crr (n) and iq_crr (n) correspond to "a correction vector". Hereinafter, in the case where the control phase direction correction values id_crr (n) and iq_crr (n) are treated as a vector, the vector is referred to as a correction vector (Δid, Δiq) as required.

The subtractors 325 subtract the control phase direction correction values id_crr (n) and iq_crr (n) from the d-axis current estimated value id_est (n−1) and the q-axis current estimated value iq_est (n−1) of the last processing, which are fed back via the delay elements 327, respectively, to thereby calculate a d-axis current estimated value id_est (n) and a q-axis current estimated value iq_est (n). Here, subtracting the control phase direction correction values id_crr (n) and iq_crr (n) from the d-axis current estimated value id_est (n−1) and the q-axis current estimated value iq_est (n−1) of the last processing by means of the subtractors 325 corresponds to "integrating the correction vector on the (d, q) axis plane".

Further, the d-axis current estimated value id_est (n) and the q-axis current estimated value iq_est (n), which are calculated in this way, are fed back to the current basic value calculation part 321 via the delay elements 327.

The other current estimation part 326 inversely dq transforms the d-axis current estimated value id_est (n) and the q-axis current estimated value iq_est (n) on the basis of the electric angle θe (n) to thereby calculate the current estimated values iu_est (n), iv_est (n), and iw_est (n) of three phases. In this regard, as required, a current estimated value of only a necessary phase, for example, only the current estimated value iv_est (n) of the V phase may be calculated. In the present embodiment, the current estimated value iv_est (n) of only the V phase of the monitor phase is calculated.

Here, a recurrence equation expressing the calculation in the current estimation part 32 will be shown by an equation (5) in which θw (n)=θe (n)+120°. Further, Kcos (θw (n)) Δiw in the equation (5) corresponds to the d-axis control phase direction correction value id_crr (n) and −K sin (θw (n)) Δiw in the equation (5) corresponds to the q-axis control phase direction correction value iq_crr (n).

[Mathematical formula 3]

$$\begin{bmatrix} id\_est(n) \\ iq\_est(n) \end{bmatrix} = \begin{bmatrix} id\_est(n-1) \\ iq\_est(n-1) \end{bmatrix} - K \begin{bmatrix} \cos(\theta w(n)) \\ -\sin(\theta w(n)) \end{bmatrix} \Delta iw \quad (5)$$

Figure 6A:
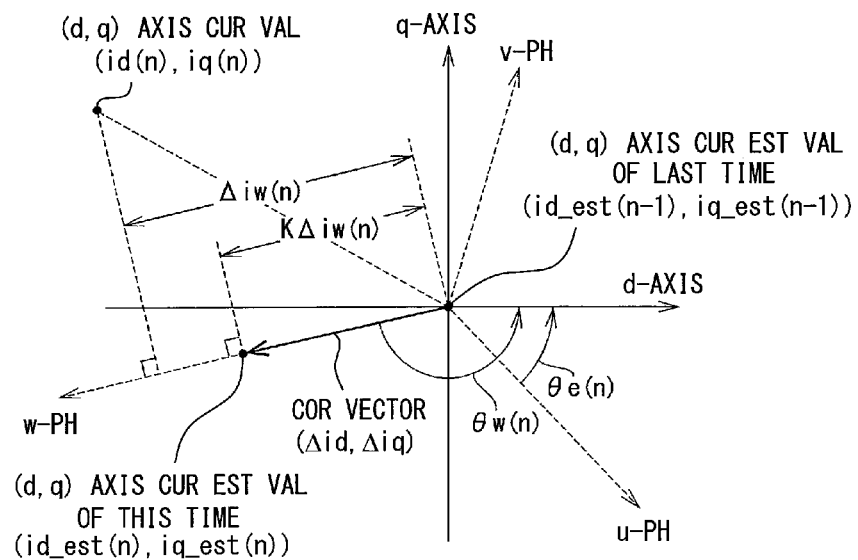
FIGS. 6A and 6B are illustrations to illustrate the current estimation according to the first embodiment of the present disclosure.
Figure 6B:
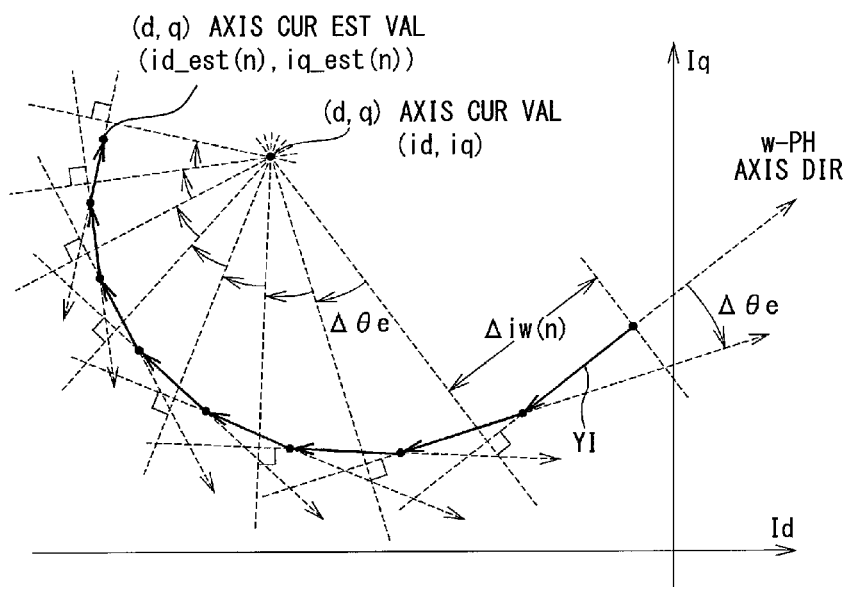

When the recurrence equation shown by the equation (5) is expressed by a vector diagram, the vector diagram shown in FIG. 6A is acquired. Here, in the present embodiment, the gain K is set in such a way that 0<K<1, so that as shown in FIG. 6B, in the (d, q) axis plane of the rotating coordinate system, by integrating the correction vector (Δid, Δiq) shown by an arrow YI by the use of the W− phase axis rotating relatively, the d-axis current estimated value id_est and the q-axis estimated value iq_est are made asymptotic to the d-axis current value id and the q-axis current value iq, respectively. In this way, the current estimation can be made with high accuracy on the basis of the current sensed value of one phase of the control phase.

Here, the gain K is a filter element for controlling a speed at which the d-axis current estimated value id_est and the q-axis estimated value iq_est are made asymptotic to the d-axis current value id and the q-axis current value iq, respectively. Further, when the gain K is too large, that is, a value comparatively close to 1, the error vector Δie (see FIG. 5) is closely perpendicular to the W− phase axis and hence moves in a circumferential direction of a circle with a center at a point having the coordinates of (the d-axis current value id, the q-axis current value) and draws a vortex, which hence makes it difficult for the d-axis current estimated value id_est and the q-axis estimated value iq_est to be asymptotic to the d-axis current value id and the q-axis current value iq, respectively. Hence, in consideration of this point, the gain K, which can easily make the d-axis current estimated value id_est and the q-axis estimated value iq_est asymptotic to the d-axis current value id and the q-axis current value iq, respectively, can be appropriately set within a range of 0<K<1.

Returning to FIG. 3, the current selection part 35 selects whether the current values, which are to be fed back to the PI calculation part 22, are made the d-axis current value id and the q-axis current value iq or the d-axis current estimated value id_est and the q-axis current estimated value iq_est. In the present embodiment, the current values, which are to be fed back to the PI calculation part 22 from the current selection part 35, are switched at specified intervals. Switching of the current values, which are to be fed back to the PI calculation part 22, will be later described in detail. Here, hereinafter, as required, the operation of feeding back the d-axis current value id and the q-axis current value iq to the PI calculation part 22 to thereby control the AC motor 2 is referred to as "two-phase control", whereas the operation of feeding back the d-axis current estimated value id_est and the q-axis current estimated value iq_est to the PI calculation part 22 to thereby control the AC motor 2 is referred to as "one-phase control".

The control phase current estimation part 41 calculates a control phase current estimated value iw_est on the basis of the monitor phase current sensed value iv_sns and the electric angle θe. Calculation in the control phase current estimation part 41 is the same as calculation in the current estimation part 32. When making a supplementary comment, the d-axis current estimated value id_est and the q-axis current estimated value iq_est, which are calculated by the use of the monitor phase current sensed value iv_sns in place of the control phase current sensed value iw_sns and on the basis of the monitor phase current sensed value iv_sns, correspond to "one-phase current sensed values for monitoring", and a component of the monitor phase of the d-axis current estimated value id_est and the q-axis current estimated value iq_est, which are calculated on the basis of the monitor phase current sensed value iv_sns, is a monitor phase current basic value iv_bf, and a monitor phase direction correction vector calculated by dq transforming a KΔiv, which is a value acquired by multiplying the monitor phase current basic value iv_bf by the gain K, corresponds to "a monitor phase correction vector".

The control phase current comparison part 42 compares the control phase current estimated value iw_est with the control phase current sensed value iw_sns. Specifically, the control phase current comparison part 42, calculates a control phase difference reference value Δiw_ref which is a value acquired by filtering the difference between the control phase current estimated value iw_est and the control phase current sensed value iw_sns by a LPF. The control phase difference reference value Δiw_ref corresponds to "a second comparison result".

The monitor phase current comparison part 43 compares the monitor phase current estimated value iv_est with the monitor phase current sensed value iv_sns. Specifically, the monitor phase current comparison part 43 calculates a monitor phase difference reference value Δiv_ref which is a value acquired by filtering the difference between the monitor phase current estimated value iv_est and the monitor phase current sensed value iv_sns by the LPF. The monitor phase difference reference value Δiv_ref corresponds to "a first comparison result".

Here, as to the respective difference reference values Δiw_ref and Δiv_ref, when the difference between the control phase current estimated value iw_est and the control phase current sensed value iw_sns is simply filtered by the LPF and the difference between the monitor phase current estimated value iv_est and the monitor phase current sensed value iv_sns is simply filtered by the LPF processing, it is impossible to detect the case where the deviation becomes plus and minus and hence the average becomes zero, for example, the case of a gain error. When attention is paid to this point, the respective differences do not need to be filtered by the LPF. However, when the control phase current sensed value iw_sns and the monitor phase current sensed value iv_sns are suddenly changed by noise and an instantaneous external disturbance, a false detection might be caused and hence it is desired to filter the respective differences by a suitable LPF. Further, depending on the electric frequency of the current and the time constant of the filter, it is more desirable to acquire an absolute value in such a way as to detect also the case where the deviation becomes plus and minus and where an error becomes apparently small when averaged, as is the case of the gain error.

The abnormality determination part 45 detects an abnormality of the control phase current sensor 12 and the monitor phase current sensor 13 on the basis of the respective difference reference values iw_ref, Δiv_ref. In the present embodiment, in the case where at least one of the difference reference values iw_ref, Δiv_ref is larger than an abnormality determination threshold value R, it is determined that an abnormality is caused in at least one of the control phase current sensor 12 and the monitor phase current sensor 13. In the case where it is determined that an abnormality is caused in at least one of the control phase current sensor 12 and the monitor phase current sensor 13, information to the effect that an abnormality is caused in at least one of the control phase current sensor 12 and the monitor phase current sensor 13 is sent to the vehicle control circuit 9, whereby the drive of the AC motor 2 by the electric motor control device 10 is stopped.

Here, current feedback processing performed by the control section 15 of the present embodiment will be described on the basis of a flow chart shown in FIG. 7 and FIG. 8. The current feedback processing is performed at given intervals (for example, at intervals of 100 µsec).

In a first step S101 (hereinafter, "step" is omitted and is expressed simply by a symbol "S"), the electric angle θe of the AC motor 2 is acquired from the rotation angle sensor 14.

In S102, the control phase current sensed value iw_sns is acquired from the control phase current sensor 12, and the monitor phase current sensed value iv_sns is acquired from the monitor phase current sensor 13.

In S103, the two-phase control current calculation part 31 calculates the d-axis current value id and the q-axis current value iq on the basis of the control phase current sensed value iw_sns, the monitor phase current sensed value iv_sns, and the electric angle θe.

In S104, the current estimation part 32 calculates the d-axis current estimated values id_est and the q-axis current estimated value iq_est and the monitor phase current estimated value iv_est on the basis of the control phase current sensed value iw_sns and the electric angle θe. Further, the control phase current estimation part 41 calculates the control phase current estimated value iw_est on the basis of the monitor phase current sensed value iv_sns and the electric angle θe.

In S105, switching determination processing is performed.

The detail of the switching determination processing performed in S105 will be described on the basis of FIG. 8.

In S151, a count value C of a counter is incremented by one.

In S152, it is determined whether or not the count value C is smaller than a two-phase/one-phase switching determination value A. The two-phase/one-phase switching determination value A is assumed to be a count value corresponding to a period (for example, several tens msec) during which the two-phase control is continuously performed as a monitoring stop mode. If it is determined that the count value C is not smaller than the two-phase/one-phase switching determination value A (S152: NO), the procedure proceeds to S154. On the other hand, if it is determined that the count value C is smaller than the two-phase/one-phase switching determination value A (S152: YES), the procedure proceeds to S153.

In S153, the monitoring stop mode is performed, that is, the control of the AC motor 2 is made the two-phase control. As specific processing in S153, a monitoring request flag is set OFF. In the case where the monitoring request flag is off, an OFF state is continued. Then, the switching determination processing is finished and then the procedure proceeds to S106 shown in FIG. 7.

In S154 to which the procedure proceeds in the case where it is determined that the count value C is not smaller than the two-phase/one-phase switching determination value A (S152: NO), the monitoring mode is performed, that is, the control of the AC motor 2 is made the one-phase control and the detection of an abnormality of the control phase current sensor 12 and the monitor phase current sensor 13 is performed. As specific processing in S154, in the present embodiment, the monitoring request flag is set ON. In the case where the monitoring request flag is on, an ON state is continued.

In next S155, it is determined whether or not the count value C is larger than a one-phase/two-phase switching determination value B. The one-phase/two-phase switching determination value B is set in such a way that a difference between the one-phase/two-phase switching determination value B and the two-phase/one-phase switching determination value A becomes a count value corresponding to a period (for example, several msec) during which the two-phase control and the detection of abnormality are performed. If it is determined that the count value C is not larger than the one-phase/two-phase switching determination value B (S155: NO), processing in S156 is not performed but the switching determination processing is finished and the procedure proceeds to S106 shown in FIG. 7. If it is determined that the count value C is larger than the one-phase/two-phase switching determination value B (S155: YES), the procedure proceeds to S156.

In S156, the count value C is reset. Further, the monitoring request flag is set OFF and the switching determination processing is finished and then the procedure proceeds to S106 shown in FIG. 7.

Returning to FIG. 7, in S106 to which the procedure proceeds after the switching determination processing is performed, it is determined whether or not a monitoring request is made. In the present embodiment, if the monitoring request flag is set, it is determined that a monitoring request is made. If it is determined that the monitoring request is made (S106: YES), that is, the monitoring request flag is set, the procedure proceeds to S108. Processing of S108 and processing of S109, which are performed in the case where it is determined that S106 is affirmative, correspond to "the monitoring mode". If it is determined that the monitoring request is not made (S106: NO), that is, if the monitoring request flag is not set, the procedure proceeds to S107. In the present embodiment, processing of S107, which is performed in the case where it is determined that S106 is negative, corresponds to "the monitoring stop mode".

In S107, the current selection part 35 selects the d-axis current value id and the q-axis current value iq as currents to be fed back to the PI calculation part 22, the d-axis current value id and the q-axis current value iq being calculated by the two-phase control current calculation part 31 by the use of the control phase current sensed value iw_sns and the monitor phase current sensed value iv_sns.

In S108 to which the procedure proceeds in the case where it is determined that the monitoring request is made (S106: YES), the current selection part 35 selects the d-axis current estimated value id_est and the q-axis current estimated value iq_est as currents to be fed back to the PI calculation part 22, the d-axis current estimated value id_est and the q-axis current estimated value iq_est being calculated by the current estimation part 32 by the use of the control phase current sensed value iw_sns.

In S109, the abnormality determination part 45 determines whether or not an abnormality is caused in the control phase current sensor 12 and the monitor phase current sensor 13. In the case where at least one of the control phase difference reference value Δiw_ref, which is calculated by the control phase current comparison part 42, and the monitor phase current difference reference value Δiv_ref, which is calculated by the monitor phase current comparison part 43, is larger than an abnormality determination threshold value R, it is determined that an abnormality is caused in at least one of the control phase current sensor 12 and the monitor phase current sensor 13 and then sets a current sensor abnormality flag.

In S110, it is determined whether or not an abnormality is caused in at least one of the control phase current sensor 12 and the monitor phase current sensor 13. In the present embodiment, the determination is made on the basis of the current sensor abnormality flag. If it is determined that an abnormality is not caused in the control phase current sensor 12 and the monitor phase current sensor 13 (S110: NO), that is, if the current sensor abnormality flag is not set, the procedure proceeds to S112. If it is determined that an abnormality is caused in at least one of the control phase current sensor 12 and the monitor phase current sensor 13 (S110: YES), that is, if the current sensor abnormality flag is set, the procedure proceeds to S111.

In S111, information to the effect that an abnormality is caused in at least one of the control phase current sensor 12 and the monitor phase current sensor 13 is sent to the vehicle control circuit 9, whereby the drive of the AC motor 2 by the electric motor control device 10 is stopped.

In S112 to which the procedure proceeds in the case where it is determined that the S110 is negative or which is performed after S107, the PI calculation part 22 performs PI calculation on the basis of the d-axis current value id and the q-axis current value iq, which are fed back from the current selection part 35, or the d-axis current estimated value id_est and the q-axis current estimated value iq_est, which are fed back from the current selection part 35, to thereby calculate the d-axis voltage command value vd* and the q-axis voltage command value vq*.

In S113, the inverse dq transformation part 23 inversely dq transforms the d-axis voltage command value vd* and the q-axis voltage command value vq* on the basis of the electric angle θe to thereby calculate three-phase voltage command values vu*, vv*, vw*.

In S114, the three-phase voltage command values vu*, vv*, vw* are outputted to the inverter 11. In the inverter 11, the switching elements are switched on/off on the basis of the three-phase voltage command values vu*, vv*, vw*, whereby three-phase AC voltages are generated. The three-phase AC voltages are impressed on the AC motor 2, whereby the drive of the AC motor is controlled.

As described above in detail, the electric motor control device 10 of the present embodiment controls the drive of the three-phase AC motor 2 in which impressed voltages vu, vv, vw are controlled by the inverter 11. In the control section 15, the following processing is performed.

Figure 7:
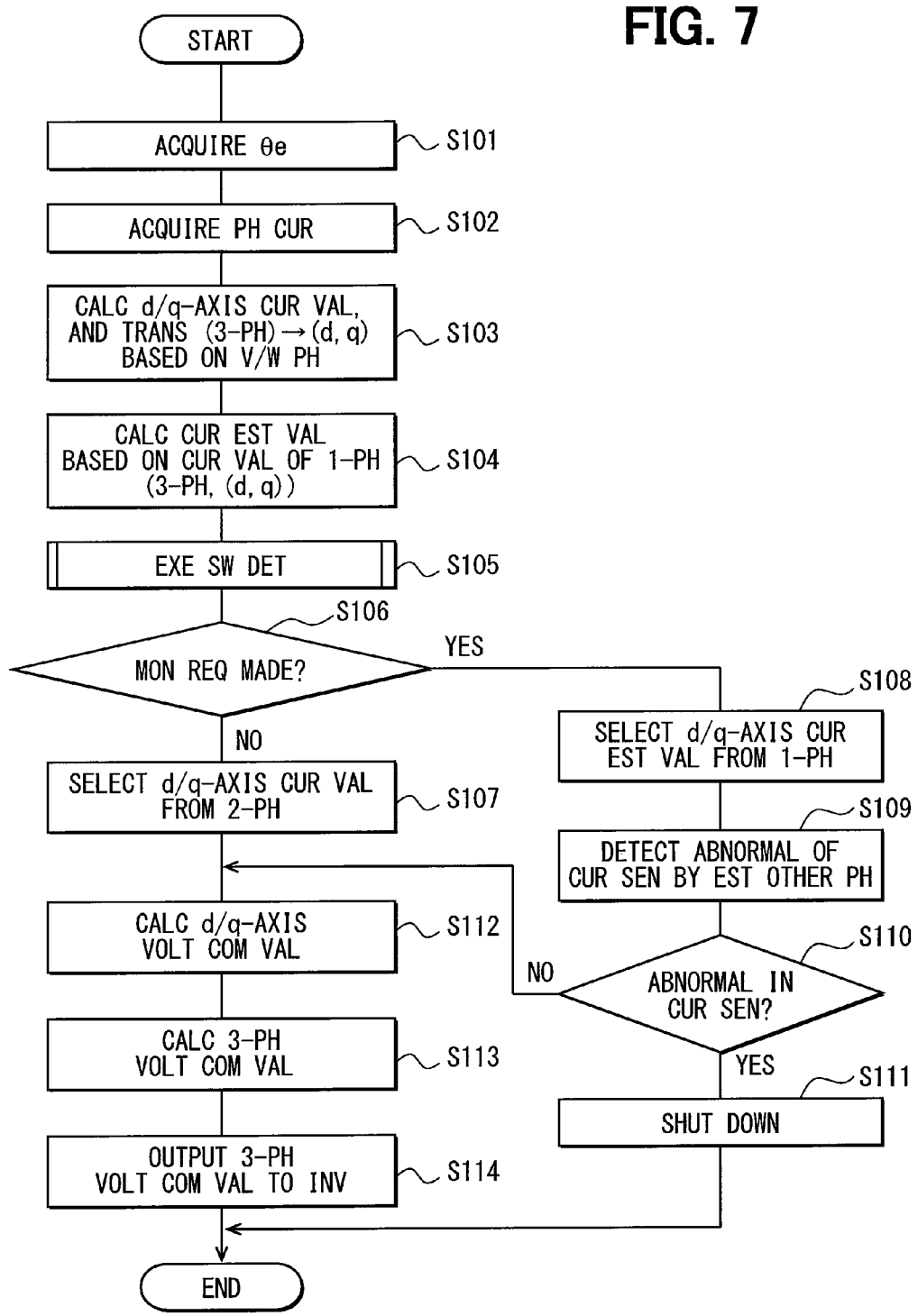
FIG. 7 is a flow chart to show current feedback control processing of the first embodiment of the present disclosure.

The control phase current sensed value iw_sns is acquired from the control phase current sensor 12 disposed for the control phase (W phase in the present embodiment) which is any one phase of the AC motor 2, and the monitor phase current sensed value iv_sns is acquired from the monitor phase current sensor 13 disposed for the monitor phase (V phase in the present embodiment) which is one phase different from the control phase of the AC motor 2 (S102 in FIG. 7). Further, the electric angle θe is acquired from the rotation angle sensor 14 for sensing the rotation angle of the AC motor 2 (S101).

The two-phase control current calculation part 31 calculates the d-axis current value id and the q-axis current value iq on the basis of the control phase current sensed value iw_sns, the monitor phase current sensed value iv_sns, and the electric angle θe (S103). The current estimation part 32 calculates the d-axis current estimated value id_est and the q-axis current estimated value iq_est on the basis of the control phase current sensed value iw_sns and the electric angle θe (S104). The PI calculation part 22 calculates the voltage command values vd*, vq* on the basis of the d-axis current value id and the q-axis current value iq, which are fed back from the current selection part 35, or the d-axis current estimated value id_est and the q-axis current estimated value iq_est, which are fed back from the current selection part 35 (S112).

Further, the current estimation part 32 calculates the monitor phase current estimated value iv_est, which is estimated on the basis of the control phase current sensed value iw_sns and the electric angle θe, and the control phase current estimation part 41 calculates the control phase current estimated value iw_est, which is estimated on the basis of the monitor phase current sensed value iv_sns and the electric angle θe (S109). The abnormality determination part 45 detects an abnormality being caused in at least one of the control phase current sensor 12 and the monitor phase current sensor 13 on the basis of at least one of the monitor phase difference reference value Δiv_ref and the control phase difference reference value Δiw_ref, the monitor phase difference reference value Δiv_ref being a comparison result between the monitor phase current estimated value iv_est and the monitor phase current sensed value iv_sns, the control phase difference reference value Δiw_ref being a comparison result between the control phase current estimated value iw_est and the control phase current sensed value iw_sns (S109).

In the present embodiment, the current selection part 35 switches between the monitoring stop mode and the monitoring mode at specified interval, the monitoring stop mode calculating the voltage command values vd*, vq* on the basis of the d-axis current value id and the q-axis current value iq, the monitoring mode calculating the voltage command values vd*, vq* on the basis of the d-axis current estimated value id_est and the q-axis current estimated value iq_est and detecting an abnormality of the control phase current sensor 12 and the monitor phase current sensor 13 (S105).

The present embodiment includes the abnormality determination part 45 and hence can detect an abnormality of the control phase current sensor 12 and the monitor phase current sensor 13. In the present embodiment, attention is focused on the fact that a detection value for detecting an abnormality does not need to be always detected and hence the monitoring stop mode and the monitoring mode are switched between them at specified intervals, the monitoring stop mode calculating the voltage command values vd*, vq* by the use of the d-axis current value id and the q-axis current value iq which are based on the control phase current sensed value iw_sns and the monitor phase current sensed value iv_sns which are the current sensed values of the control phase (W phase) and the monitor phase (V phase), respectively, the monitoring mode calculating the voltage command values vd*, vq* by the use of the d-axis current estimated value id_est and the q-axis current estimated value iq_est which are based on the control phase current sensed value iw_sns of one phase of the control phase (W phase) and detecting an abnormality of the control phase current sensor 12 and the monitor phase current sensor 13. In other words, in the present embodiment, the monitor phase current sensed value iv_sns acquired from the monitor phase current sensor 13 is used not only for "monitoring" but also for "controlling". The period during which the monitor phase current sensed value iv_sns acquired from the monitor phase current sensor 13 is used for "monitoring" and the period during which the monitor phase current sensed value iv_sns acquired from the monitor phase current sensor 13 is used for "controlling" are switched as appropriate between them.

In this way, in the monitoring stop mode, the current feedback control is performed at high speed and with high accuracy by the use of the d-axis current value id and the q-axis current value iq which are based on the control phase current sensed value iw_sns and the monitor phase current sensed value iv_sns which are the current sensed values of two phases. On the other hand, the monitoring stop mode is switched to the monitoring mode at specified intervals, and in the monitoring mode, the monitor phase current sensed value iv_sns is not used for the current feedback control but the current feedback control is performed by the use of the control phase current sensed value iw_sns of one phase, which hence can prevent the current feedback control from interfering with the monitor phase current sensed value iv_sns and can detect an abnormality of the control phase current sensor 12 and the monitor phase current sensor 13. In the present embodiment, an abnormality of the control phase current sensor 12 and the monitor phase current sensor 13 is detected on the basis of the difference reference values Δiw_ref and Δiv_ref which are the comparison results of the current estimated value and the current sensed value. One of the current estimated value and the current sensed value, which are to be compared with each other, is not used for the current feedback control and hence is the monitor phase current sensed value iv_sns itself, which is independent of a current feedback loop, or the control phase current estimated value iw_est which is based on the monitor phase current sensed value iv_sns, thereby being not affected by the interference of the current feedback control.

Specifically, the control phase current estimated value iw_est estimated by the control phase current estimation part 41 is calculated on the basis of the monitor phase current sensed value iv_sns, which is not used for the calculation of the d-axis current estimated value id_est and the q-axis current estimated value iq_est by the current estimation part 32 at the time of one-phase control, and hence is not affected by the interference of the current feedback control. Further, the monitor phase current sensed value iv_sns used for the comparison by the monitor phase current comparison part 43 is not affected by the interference of the current feedback control, either.

In this way, it is possible to suitably detect an abnormality of the current sensor, in more detail, an abnormality being caused in at least one of the control phase current sensor 12 and the monitor phase current sensor 13. Further, two requirements of control performance and abnormality detection can be achieved by a minimum number of current sensors and a current sensor for monitoring for the purpose of detecting an abnormality of a current sensor does not need to be disposed for one independent phase. In this way, it is possible to achieve downsizing and cost reduction as compared with a case where a current sensor for monitoring is disposed for one independent phase.

Still further, in the present embodiment, the abnormality of the control phase current sensor 12 and the monitor phase current sensor 13 is detected on the basis of two difference reference values Δiw_ref and Δiv_ref and hence the abnormality can be more suitably detected.

In the present embodiment, the two-phase control current calculation part 31 calculates the d-axis current value id and the q-axis current value iq in both of the monitoring mode and the monitoring stop mode. Further, the current estimation part 32 calculates the d-axis current estimated value id_est and the q-axis current estimated value iq_est and the monitor phase current estimated value iv_est in both of the monitoring mode and the monitoring stop mode. Similarly, the control phase current estimation part 41 calculates the control phase current estimated values iw_est in both of the monitoring mode and the monitoring stop mode.

In other words, in the present embodiment, the d-axis current estimated value id_est and the q-axis current estimated value iq_est are calculated even in the monitoring stop mode for performing the two-phase control. For this reason, even in the calculation including a filter system like the calculation method in the current estimation part 32 of the present embodiment, the state can be kept in which the error between the d-axis current estimated value id_est and the d-axis current value id and the error between the q-axis current estimated value iq_est and the q-axis current value iq are small. In this way, when the monitoring stop mode is switched to the monitoring mode, that is, the two-phase control is switched to the one-phase control, it is possible to prevent the control of the AC motor 2 from being made unstable by the error between the d-axis current estimated value id_est and the d-axis current value id and the error between the q-axis current estimated value iq_est and the q-axis current value iq.

Further, in the present embodiment, the current estimation part 32 calculates the d-axis current estimated value id_est and the q-axis current estimated value iq_est by integrating the control phase direction correction values id_crr, iq_crr on the (d, q) axis plane, the control phase direction correction values id_crr, iq_crr being calculated on the basis of a current basic value iw_bf and the control phase current sensed value iw_sns which are control phase components of the d-axis current estimated value id_est and the q-axis current estimated value iq_est which are calculated in the last calculation. In more detail, in the present embodiment, the control phase direction correction values id_crr, iq_crr in the control phase direction are integrated on the (d, q) axis plane.

Further, the current estimation part 32 calculates the monitor phase current estimated value iv_est on the basis of the d-axis current estimated value id_est and the q-axis current estimated value iq_est.

Still further, the control phase current estimation part 41 calculates the one-phase current estimated values for monitoring ((d, q) axis current estimated value) based on the monitor phase current sensed value iv_sns and the electric angle θe, and calculates the one-phase current estimated value for monitoring by integrating a monitor phase correction vector on the (d, q) axis plane, the monitor phase correction vector being calculated on the basis of the monitor phase current basic value iv_bf and the monitor phase current sensed value iv_sns which are monitor phase components of the one-phase control current value for monitoring, which is calculated in the last calculation. Then, the control phase current estimation part 41 calculates the control phase current estimated value iw_est on the basis of the calculated one-phase current estimated value for monitoring.

In the present embodiment, attention is focused on the fact that the control phase axis rotates on the (d, q) axis plane, and hence the d-axis current estimated value id_est and the q-axis current estimated value iq_est can be calculated with high accuracy by using the control phase direction correction values id_crr, iq_crr which rotate with the rotation of the AC motor 2. In the present embodiment, the AC motor 2 is applied to the main motor of the hybrid vehicle or the electric vehicle, and hence by controlling the AC motor 2 with high accuracy, it is possible to prevent drivability from being impaired by the generation of an abnormal torque and to prevent various kinds of elements constructing the electric motor control device 10 from causing an abnormality and a failure.

In the present embodiment, the control section 15 constructs "a control phase current acquisition means", "a monitor phase current acquisition means", "a rotation angle acquisition means", "a current calculation means", "a current estimation means", "a voltage command calculation means", "an other phase current estimation means", "an abnormality detection means", and "a switching means". In more detail, the two-phase control current calculation part 31, the current estimation part 32, and the control phase current comparison part 42 construct "the control phase current acquisition means". The control phase current estimation part 41 and the monitor phase current comparison part 43 construct "the monitor phase current acquisition means". The PI calculation part 22, the two-phase control current calculation part 31, the current estimation part 32, and the control phase current estimation part 41 construct "the rotation angle acquisition part". Further, the two-phase control current calculation part 31 constructs "the current calculation means", and the current estimation part 32 constructs "the current estimation means", and the PI calculation part 22 constructs "the voltage command value calculation means". Still further, the current estimation part 32 and the control phase current estimation part 41 construct "the other phase current estimation means", and the abnormality determination part 45 constructs "the abnormality determination means", and the current selection part 35 constructs "the switching means".

In addition, S102 in FIG. 7 corresponds to processing as the functions of "the control phase current acquisition means" and "the monitor phase current acquisition means", and S101 corresponds to processing as the function of "the rotation angle acquisition means", and S103 corresponds to processing as the function of "the current calculation means", and S104 corresponds to processing as the functions of "the current estimation means" and "the other phase current estimation means", and S112 corresponds to processing as the function of "the voltage command current calculation means". Further, S109 corresponds to processing as the function of "the abnormality detection means", and S107 and S108 correspond to processing as the function of "the switching means".

In the present embodiment, the electric angle θe corresponds to "the rotation angle sensed value", and the d-axis current value id and the q-axis current value iq correspond to "two-phase control current values", and the d-axis current estimated value id_est and the q-axis current estimated value iq_est correspond to "the one-phase current estimated values for controlling", and the monitor phase difference reference value Δiv_ref corresponds to "a first comparison result", and the control phase difference reference value Δiw_ref corresponds to "a second comparison result".

Second Embodiment

A control device of an AC motor according to a second embodiment of the present disclosure will be described on the basis of FIG. 9 and FIG. 10.

A second embodiment of the present disclosure is different from the first embodiment in that: at the time of the two-phase control, the current estimation processing in the current estimation part 32 is not performed; and at the time of the one-phase control, the calculation of the d-axis current value id and the q-axis current value iq in the two-phase control current calculation part 31 is not performed. Hence, this point will be mainly described and the descriptions of the other constructions will be omitted.

Figure 9:
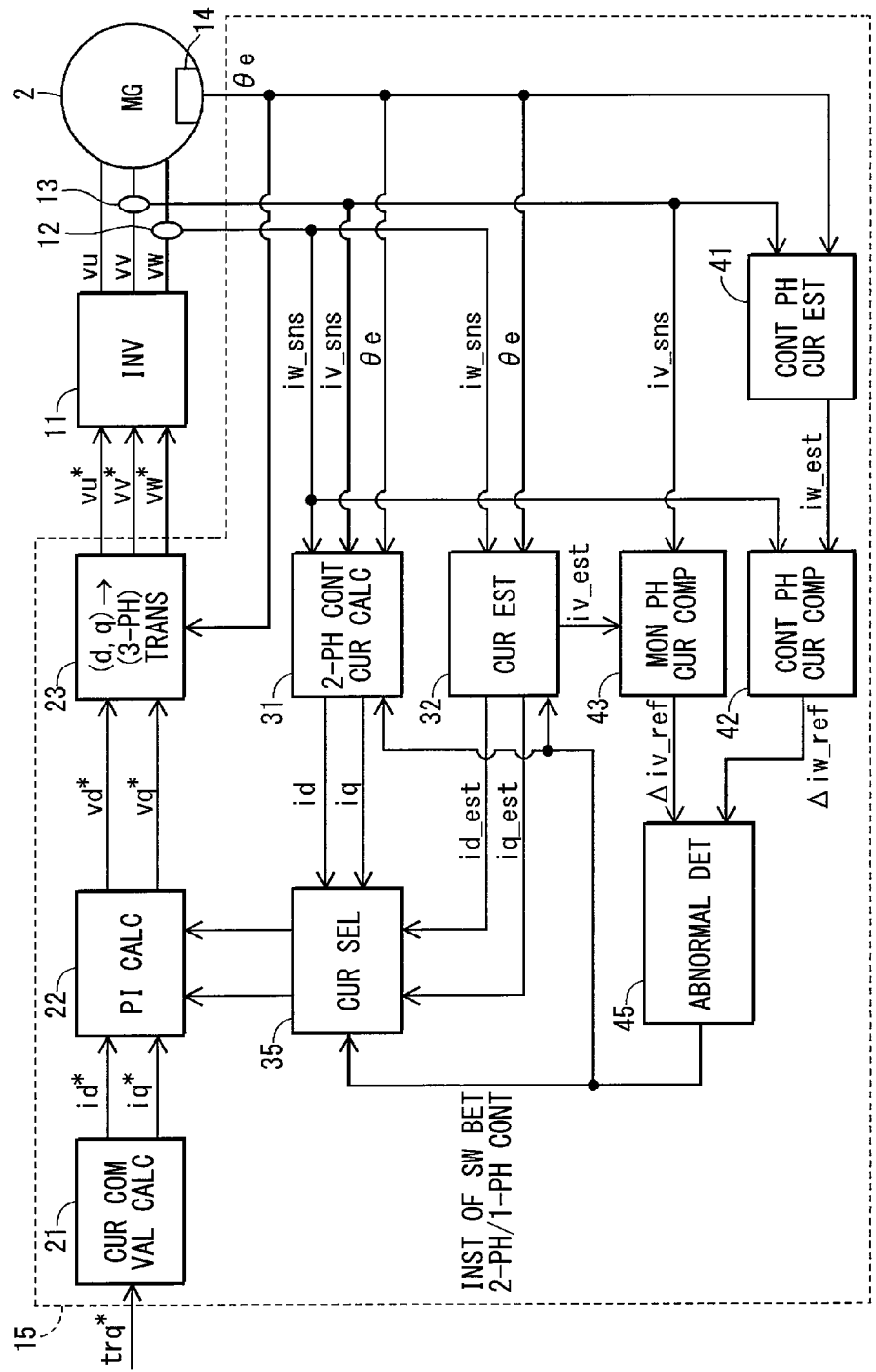
FIG. 9 is a block diagram to show a construction of an electric motor control device of a second embodiment of the present disclosure.

As shown in FIG. 9, in the case where the abnormality determination part 45 makes an abnormality determination, that is, a monitoring request is made, the two-phase control current calculation part 31 stops calculating the d-axis current value id and the q-axis current value iq. On the other hand, in the case where the abnormality determination part 45 does not make the abnormality determination, that is, the monitoring request is not made, the current estimation part 32 stops calculating the current estimation processing.

Here, current feedback processing in the present embodiment will be described on the basis of FIG. 10. Pieces of processing of S201, S202 are the same as the pieces of processing of S101, S102 shown in FIG. 7 and hence their descriptions will be omitted.

The control phase current sensed value iw_sns and the monitor phase current sensed value iv_sns are acquired in S202, and then the procedure proceeds to S203. Processing of S203 is the same as the processing of S105 shown in FIG. 7. That is, in the present embodiment, before the switching determination processing, the two-phase control current calculation part 31 does not calculate the d-axis current value id and the q-axis current value iq, and the current estimation part 32 does not calculate the d-axis current estimated value id_est and the q-axis current estimated value iq_est.

Here, the processing of S203 is the same as the processing of S105 and hence its description will be omitted.

In S204, it is determined whether or not a monitoring request is made. A determination method is the same as S106 shown in FIG. 7. If it is determined that a monitoring request is made (S204: YES), the procedure proceeds to S207. In the present embodiment, S208 and S209, which are performed in the case where it is determined that S204 is affirmative, correspond to "the monitoring mode". If it is determined that a monitoring request is not made (S204: NO), the procedure proceeds to S205. In the present embodiment, S206, which is performed in the case where it is determined that S204 is negative, corresponds to "the monitoring stop mode".

S205 is the same as S103, and the two-phase control current calculation part 31 calculates the d-axis current value id and the q-axis current value iq.

S206 is the same as S107, and the current selection part 35 selects the d-axis current value id and the q-axis current value iq as currents to be fed back to the PI calculation part 22, the d-axis current value id and the q-axis current value iq being calculated by the two-phase control current calculation part 31 by the use of the control phase current sensed value iw_sns and the monitor phase current sensed value iv_sns.

S207, to which the procedure proceeds in the case where it is determined that an abnormality determination request is made (S205: YES), is the same as S104, and the current estimation part 32 calculates the d-axis current estimated value id_est and the q-axis current estimated value iq_est and the monitor phase current estimated value iv_est, and the control phase current estimation part 41 calculates the control phase current estimated value iw_est.

S208 is the same as S108, and the current selection part 35 selects the d-axis current estimated value id_est and the q-axis current estimated value iq_est as currents to be fed back to the PI calculation part 22, the d-axis current estimated value id_est and the q-axis current estimated value iq_est being calculated by the current estimation part 32 by the use of the control phase current sensed value iw_sns.

Pieces of processing of S209 to S214 are the same as the pieces of processing of S109 to S114, and hence their descriptions will be omitted.

In the present embodiment, the two-phase control current estimation part 31 stops calculating the d-axis current value id and the q-axis current value iq in the monitoring mode. Further, the current estimation part 32 stops calculating the d-axis current estimated value id_est and the q-axis current estimated value iq_est and the monitor phase current estimated value iv_est in the monitoring stop mode. Similarly, the control phase current estimation part 41 stops calculating the control phase current estimated value iw_est in the monitoring stop mode.

In other words, in the present embodiment, in the case where the monitoring request is made, the d-axis current estimated value id_est, the q-axis current estimated value iq_est, the monitor phase current estimated value iv_est, and the control phase current estimated value iw_est are calculated. On the other hand, in the case where the monitoring request is not made, the d-axis current estimated value id_est, the q-axis current estimated value iq_est, the monitor phase current estimated value iv_est, and the control phase current estimated value iw_est are not calculated. Further, in the case where the monitoring request is not made, the d-axis current value id and the q-axis current value iq are calculated, whereas in the case where the monitoring request is made, the d-axis current value id and the q-axis current value iq are not calculated.

In this way, as compared with the case where the d-axis current estimated value id_est and the q-axis current estimated value iq_est, the monitor phase current estimated value iv_est, the control phase current estimated value iw_est, and the d-axis current value id and the q-axis current value iq are constantly calculated, a calculation load can be reduced and hence resources can be saved.

Further, the same effects as the embodiment described above can be produced.

Figure 10:
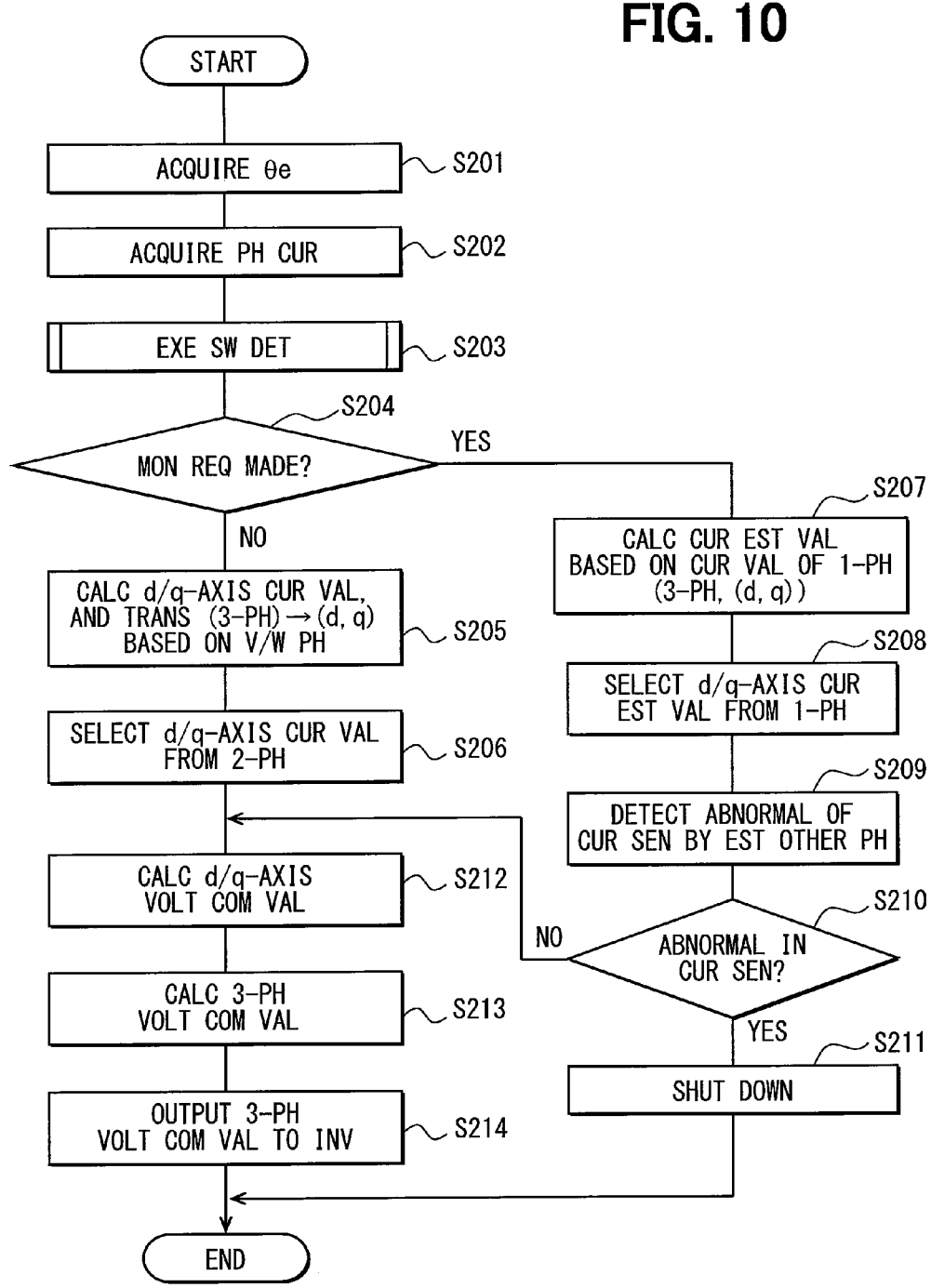
FIG. 10 is a flow chart to show current feedback control processing of the second embodiment of the present disclosure.

In the present embodiment, S202 shown in FIG. 10 corresponds to processing as the function of "the control phase current acquisition means" and "the monitor phase current acquisition means", S201 corresponds to processing as the function of the "rotation angle acquisition means", S205 corresponds to processing as the function of "the current calculation means", S207 corresponds to processing as the functions of "the current estimation means" and "the other phase current estimation means", S212 corresponds to processing as the function of "the voltage command value calculation means", S209 corresponds to processing of the function of "the abnormality detection means", and S206 and S208 correspond to processing of the function of "the switching means".

Third Embodiment

A third embodiment is a modified example of the second embodiment. Current feedback processing according to the third embodiment will be described on the basis of FIG. 11 and FIG. 12.

As described in the first embodiment, the current estimation part 32 performs the calculation of the filtering system, so that the d-axis current estimated value id_est and the q-axis current estimated value iq_est after the start of the calculation do not always agree with the actual d-axis current value id and the actual q-axis current value iq. For this reason, in the present embodiment, the calculation of the d-axis current estimated value id_est and the q-axis current estimated value iq_est is started at a given timing before a timing when the two-phase control is switched to the one-phase control.

Figure 11:
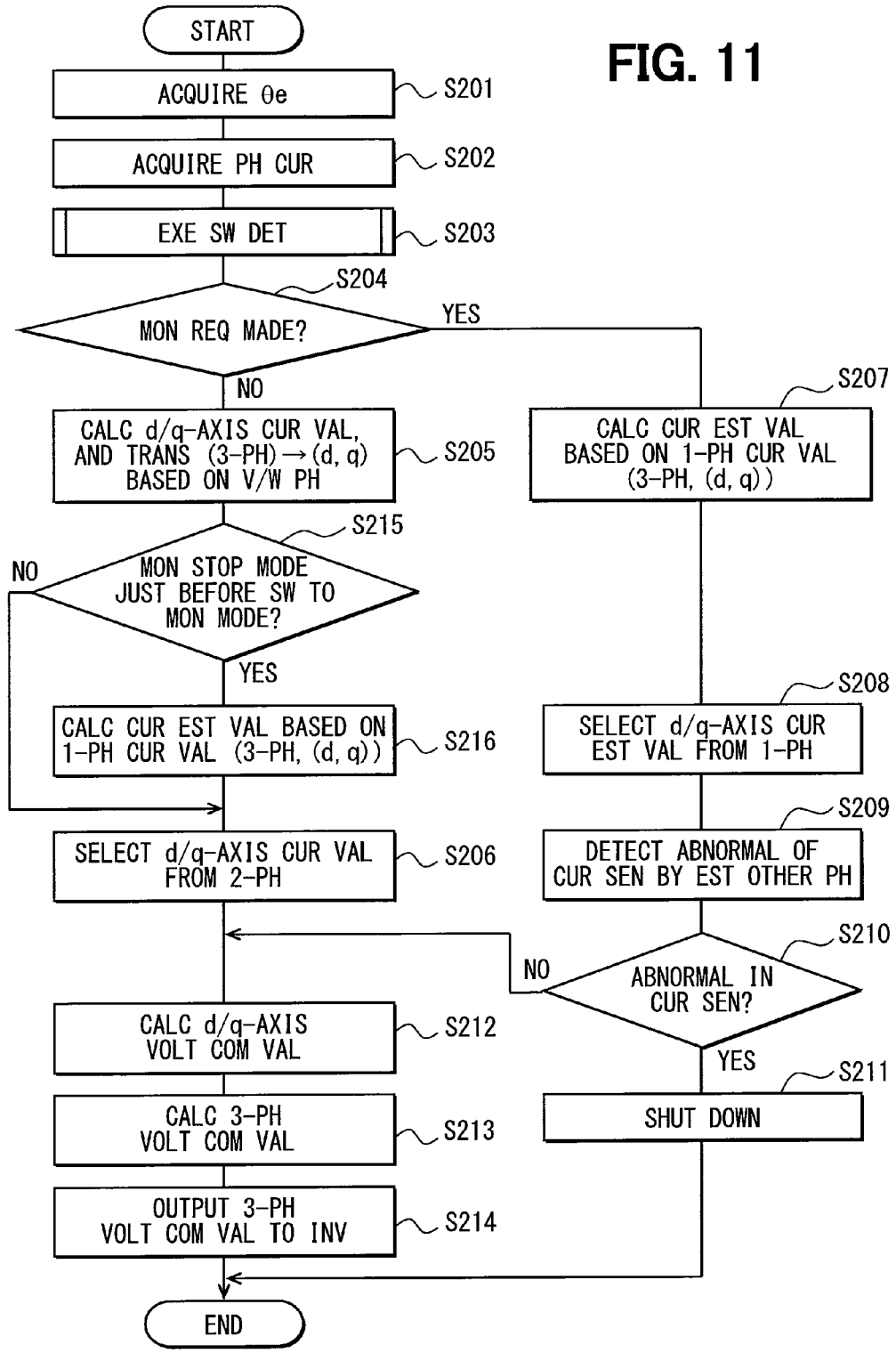
FIG. 11 is a flow chart to show current feedback control processing of a third embodiment of the present disclosure.

The present embodiment is different from the second embodiment as the whole of the current feedback processing shown in FIG. 11 in that S215 and S216 are added between S205 and S206 and in the switching determination processing of S203. Here, these points will be mainly described and other constructions will be omitted.

Figure 12:
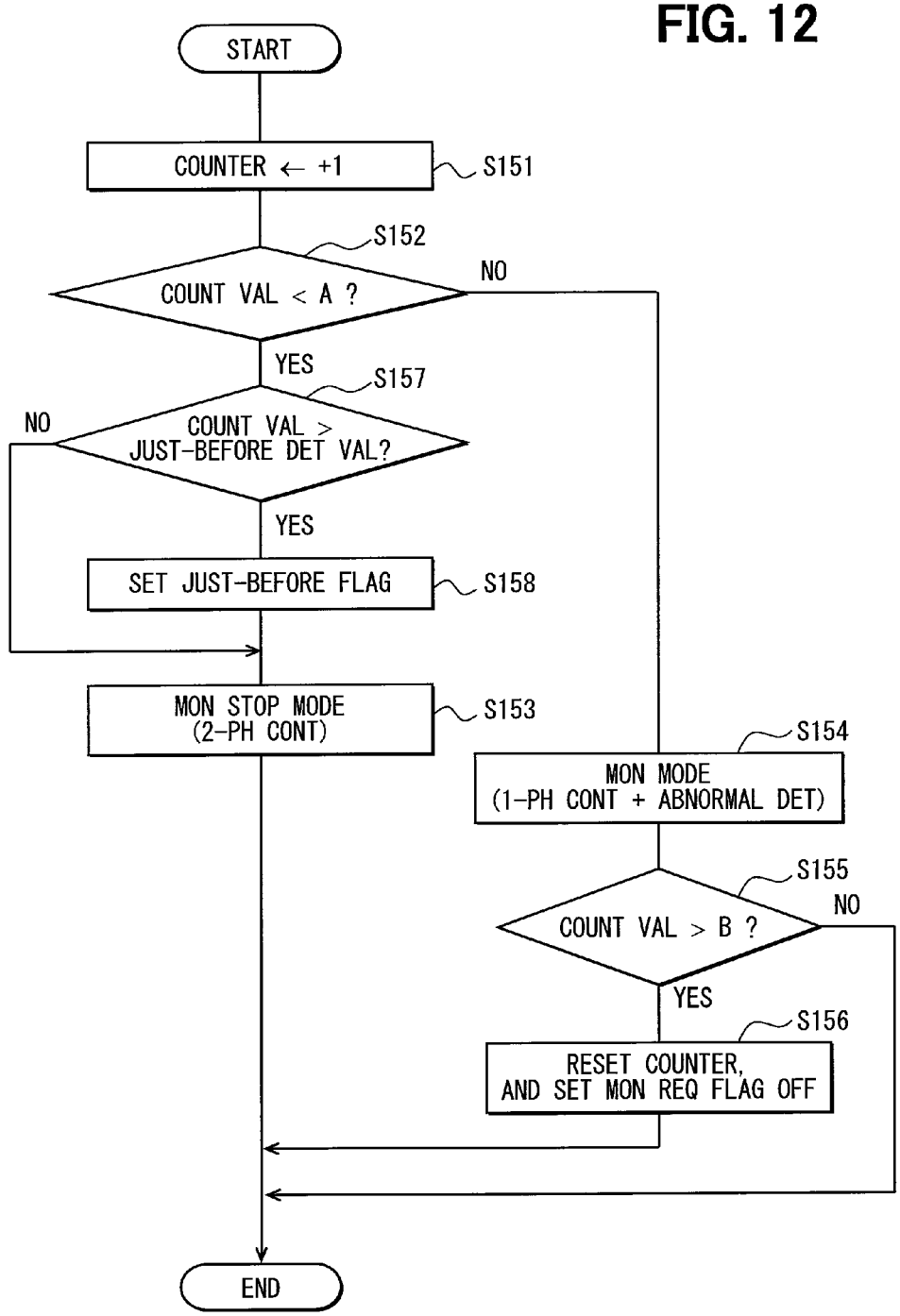
FIG. 12 is a flow chart to show switching determination processing of the third embodiment of the present disclosure.

First, the switching determination processing will be described on the basis of FIG. 12. In the switching determination processing of the present embodiment, S157 and S158 are added between S152 and S153. In S157 to which the procedure proceeds in the case where it is determined that the count value C is smaller than the two-phase/one-phase switching determination value A (S152: YES), it is determined whether or not the count value C is larger than a just-before determination value A1. The just-before determination value A1 is a value smaller than the two-phase/one-phase switching determination value A and the difference between the two-phase/one-phase switching determination value A and the just-before determination value A1 is set according to the time required for the d-axis current estimated value id_est and the q-axis current estimated value iq_est to be asymptotic to the d-axis current value id and the q-axis current value iq, respectively, to thereby enhance an estimation accuracy. If it is determined that the count value C is not larger than the just-before determination value A1 (S157: NO), processing of S158 is not performed but the procedure proceeds to S153. If it is determined that the count value C is larger than the just-before determination value A1 (S157: YES), the procedure proceeds to S158.

In S158, a flag of just-before switching to one-phase control is set and the procedure proceeds to S153. In the present embodiment, the timing when the count value C becomes the just-before determination value A1 corresponds to "a specified timing before switching to the monitoring mode".

Subsequently, S215 and S216 added to FIG. 11 will be described. In S215 to which the procedure proceeds after S205, it is determined whether or not the monitoring stop mode is just before switching to the monitoring mode, that is, the two-phase control is just before switching to the one-phase control. In the present embodiment, whether or not the two-phase control is just before switching to the one-phase control is determined by whether or not the flag of just-before switching to one-phase control is set. If it is determined that the two-phase control is not just before switching to the one-phase control (S215: NO), that is, if the flag of just-before switching to one-phase control is not set, the processing of S216 is not performed but the procedure proceeds to S206. If it is determined that the two-phase control is just before switching to the one-phase control (S215: YES), the procedure proceeds to S216.

S216 is the same as the processing of S104 shown in FIG. 7, and the current estimation part 32 calculates the d-axis current estimated value id_est and the q-axis current estimated value iq_est and the monitor phase current estimated value iv_est, and the control phase current estimation part 41 calculates the control phase current estimated value iw_est.

In the present embodiment, the two-phase control current calculation part 31 stops calculating the d-axis current value id and the q-axis current value iq in the monitoring mode. Further, the current estimation part 32 stops calculating the d-axis current estimated value id_est and the q-axis current estimated value iq_est and the monitor phase current estimated value iv_est in the monitoring stop mode and starts calculating the d-axis current estimated value id_est and the q-axis current estimated value iq_est and the monitor phase current estimated value iv_est from a specified timing before the monitoring stop mode being switched to the monitoring mode (S216). Similarly, the control phase current estimation part 41 stops calculating the control phase current estimated value iw_est in the monitoring stop mode and starts calculating the control phase current estimated value iw_est from a specified timing when the monitoring stop mode is switched to the monitoring mode (S216).

In the present embodiment, the d-axis current estimated value id_est and the q-axis current estimated value iq_est are calculated from the specified timing before the monitoring stop mode being switched to the monitoring mode. In this way, when the monitoring stop mode is switched to the monitoring mode, that is, the two-phase control is switched to the one-phase control, the error between the d-axis current estimated value id_est and the d-axis current value id and the error between the q-axis current estimated value iq_est and the q-axis current value iq can be made small, so that when the two-phase control is switched to the one-phase control, it is possible to prevent the control of the AC motor 2 from being made unstable by the error between the d-axis current estimated value id_est and the d-axis current value id and the error between the q-axis current estimated value iq_est and the q-axis current value iq.

Further, as compared with the case where the d-axis current estimated value id_est and the q-axis current estimated value iq_est, the monitor phase current estimated value iv_est, the control phase current estimated value iw_est, and the d-axis current value id and the q-axis current value iq are constantly calculated, a calculation load can be reduced and the resources can be saved.

Still further, the same effects as the embodiments described above can be produced.

Fourth Embodiment

Figure 13:
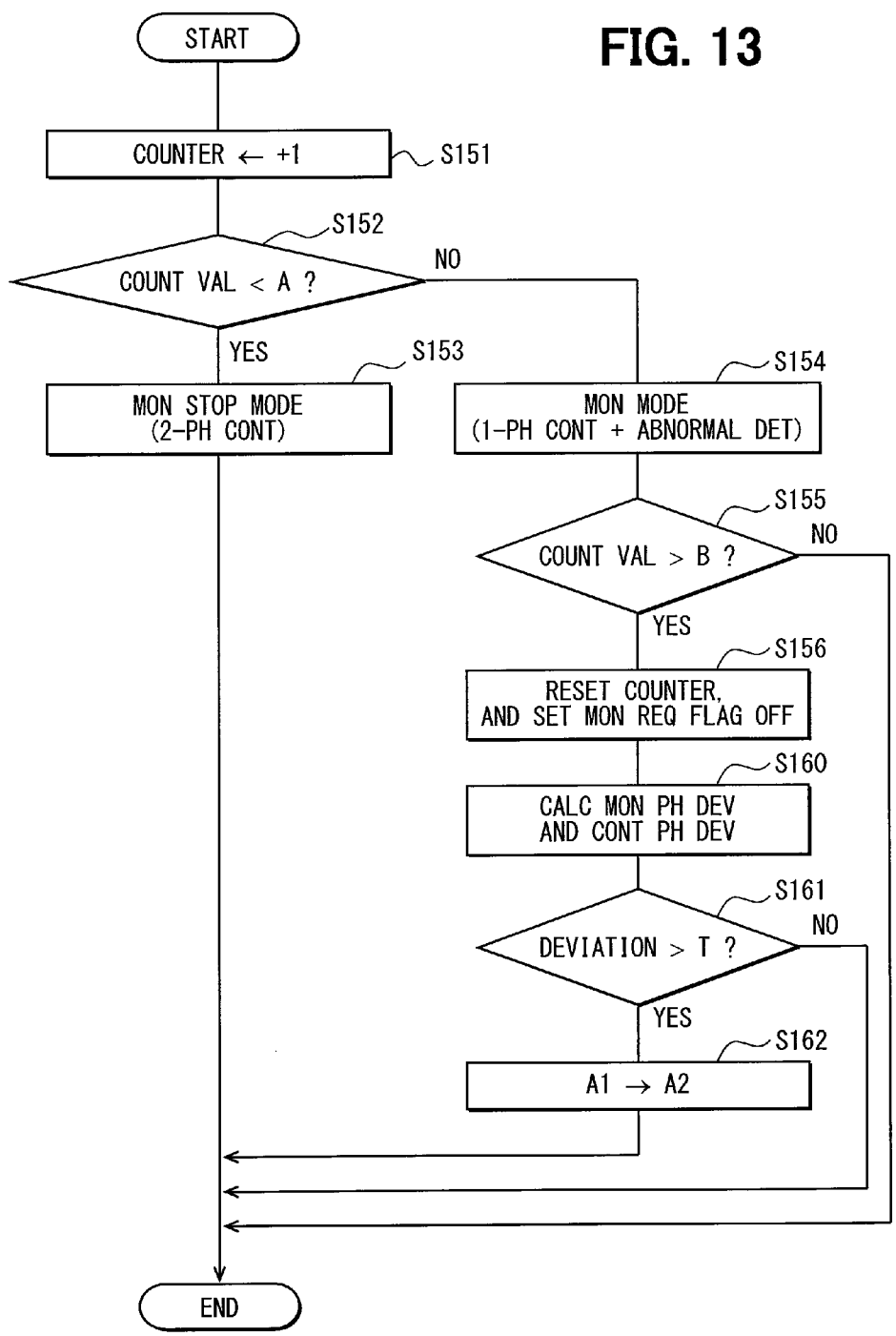
FIG. 13 is a flow chart to show switching determination processing of a fourth embodiment of the present disclosure.

A control device of an AC motor according to a fourth embodiment of the present disclosure will be described on the basis of FIG. 13. The present embodiment is different from the first embodiment only in the switching determination processing, so this point will be mainly described and other constructions will be omitted.

In the switching determination processing of the present embodiment, S160 to S162 are added to the first embodiment after S156 of the switching determination processing. Pieces of processing of S151 to S156 are the same as the first embodiment.

In S160 to which the procedure proceeds after S156, a control phase deviation of a deviation between the control phase current estimated value iw_est and the control phase current sensed value iw_sns and a monitor phase deviation of a deviation between the monitor phase current estimated value iv_est and the monitor phase current sensed value iv_sns are calculated. The control phase difference reference value Δiw_ref calculated by the control phase current comparison part 42 is made the control phase deviation, whereas the monitor phase difference reference value Δiv_ref calculated by the monitor phase current comparison part 43 is made the monitor phase deviation.

In S161, it is determined whether or not each of the control phase difference reference value Δiw_ref and the monitor phase difference reference value Δiv_ref is larger than a deviation determination threshold value T. The deviation determination threshold value T is set at a value smaller than the abnormality determination threshold value R relating to the abnormality determination, that is, T<R. If each of the control phase difference reference value Δiw_ref and the monitor phase difference reference value Δiv_ref is not larger than the deviation determination threshold value T (S161: NO), the processing of S162 is not performed but the switching determination processing is finished. If at least one of the control phase difference reference value Δiw_ref and the monitor phase difference reference value Δiv_ref is larger than the deviation determination threshold value T (S161: YES), the processing proceeds to S162.

In S162, the two-phase/one-phase switching determination value A relating to the period during which the two-phase control is performed is changed to a change value A2. The change value A2 of the present embodiment is a value smaller than the two-phase/one-phase switching determination value A, that is, A2<A.

In the present embodiment, the period of the monitoring stop mode can be changed according to the monitor phase deviation of the deviation between the monitor phase current estimated value iv_est and the monitor phase current sensed value iv_sns, or the control phase deviation of the deviation between the control phase current estimated value iw_est and the control phase current sensed value iw_sns. In more detail, if at least one of the monitor phase difference reference value Δiv_ref and the control phase difference reference value Δiw_ref is larger than the deviation determination threshold value T (S161: YES), the period of the monitoring stop mode is made shorter (S162).

In other words, in the present embodiment, in the case where at least one of the monitor phase difference reference value Δiv_ref and the control phase difference reference value Δiw_ref is larger than the deviation determination threshold value T and is not larger than the abnormality determination threshold value R, it is not determined that an abnormality is caused in the control phase current sensor 12 and the monitor phase current sensor 13, but because a deviation starts to be caused, at least one of the control phase current sensor 12 and the monitor phase current sensor 13 is likely to cause an abnormality in near future. For this reason, by changing the two-phase/one-phase switching determination value A to the change value A2, the period of the monitoring stop mode during which abnormality detection is not performed is made shorter, which hence can increase the frequency of the abnormality detection. In this way, the abnormality of the control phase current sensor 12 and the monitor phase current sensor 13 can be more suitably detected and, at the same time, when it is determined that the monitor phase deviation, that is, the monitor phase difference reference value Δiv_ref and the control phase deviation, that is, the control phase difference reference value Δiw_ref are smaller than the deviation determination threshold value T, the period of the monitoring stop mode, that is, the period of the two-phase control mode can be made longer, which hence can further enhance control performance.

Further, the same effect as the embodiments described above can be produced.

Fifth Embodiment

A control device of an AC motor of a fifth embodiment of the present disclosure will be described on the basis of FIG. 14 to FIG. 18.

As described in FIG. 6, the current estimation part 32 integrates the correction vector (Δid, Δiq) shown by an arrow Y1 by the use of the W− phase axis relatively rotating on the (d, q) axis plane of the rotating coordinate system, thereby making the d-axis current estimated value id_est and the q-axis current estimated value iq_est asymptotic to the d-axis current value id and the q-axis current value iq, respectively.

Figure 14A:
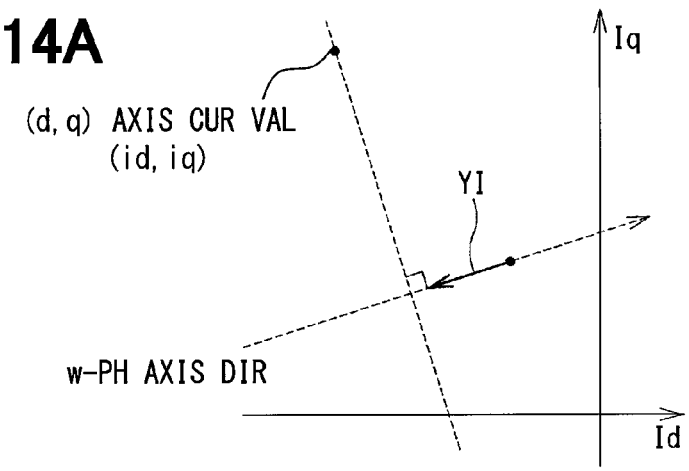
FIGS. 14A, 14B, and 14C are illustrations to illustrate a current estimation in the case where the number of revolutions is large in a fifth embodiment of the present disclosure.
Figure 14B:
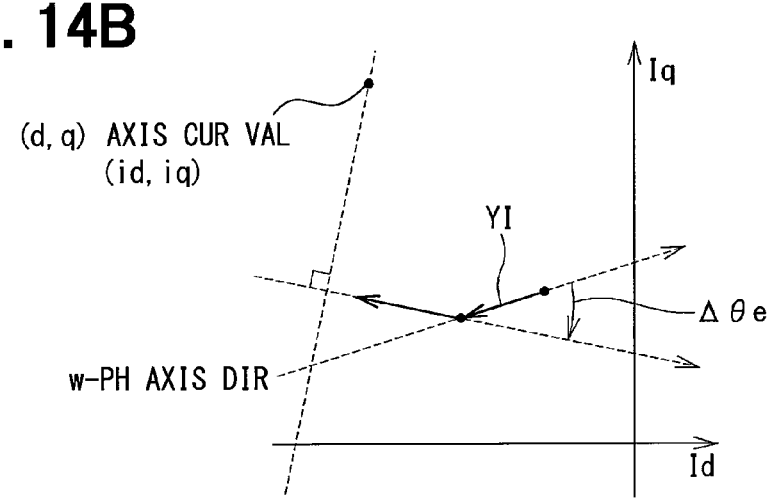
Figure 14C:
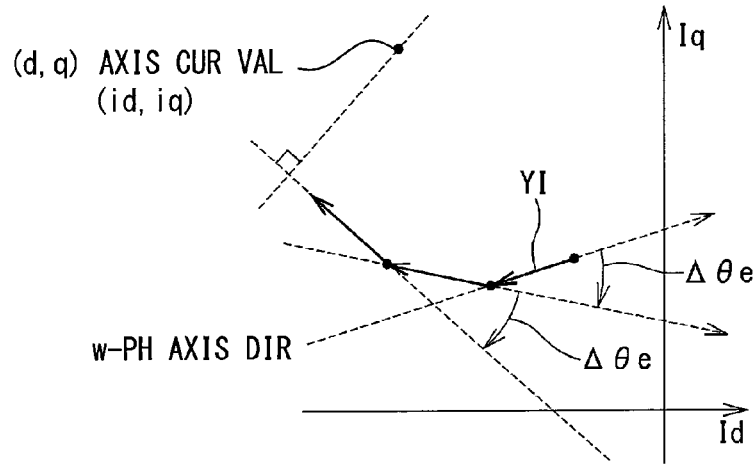
Figure 15A:
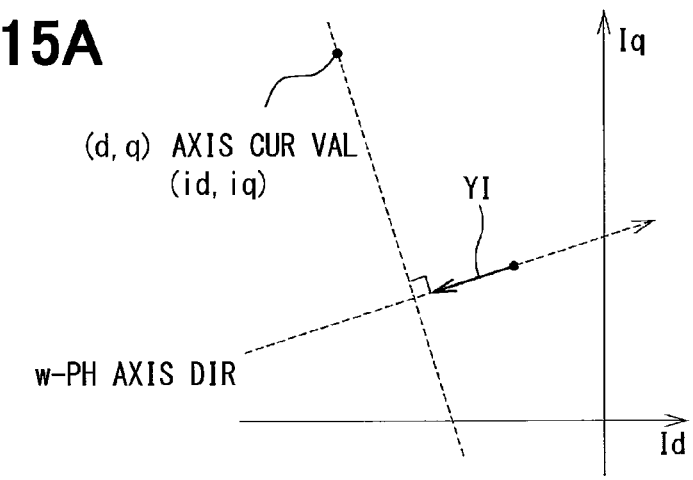
FIGS. 15A, 15B, and 15C are illustrations to illustrate a current estimation in the case where the number of revolutions is small in the fifth embodiment of the present disclosure.
Figure 15B:
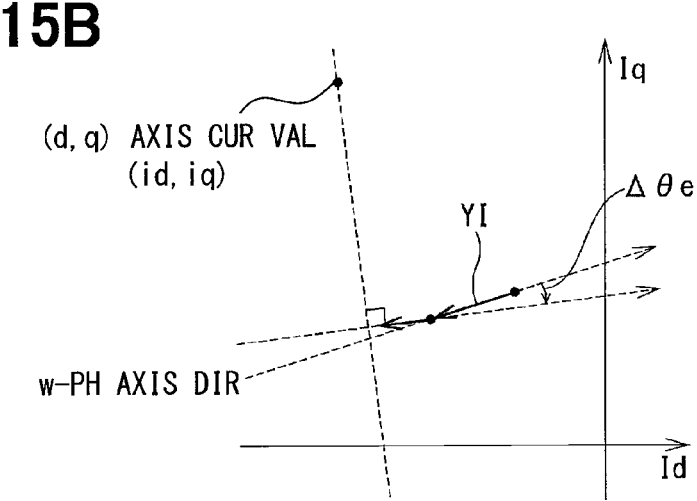
Figure 15C:
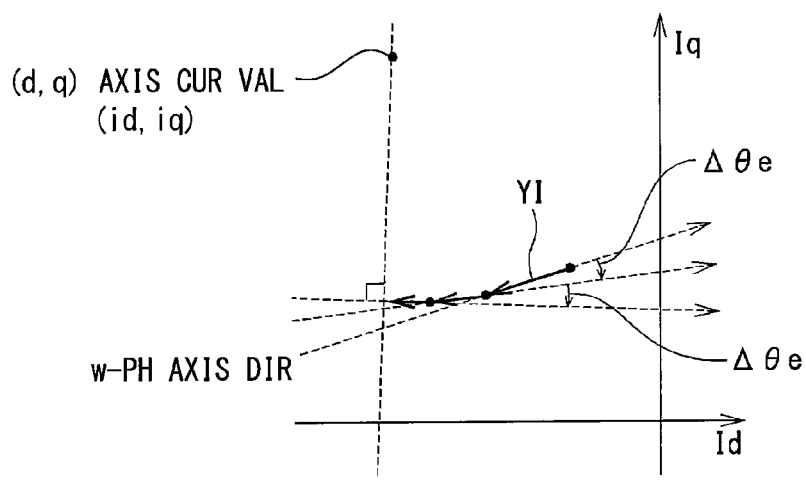

Here, FIG. 14 and FIG. 15 show the way that the W− phase axis rotates on the (d, q)-axis plane, like (A)→(B)→(C).

As shown in FIG. 14, in the case where the angular movement Δθe of the electric angle θe is comparatively large, that is, the number of revolutions N of the AC motor 2 is large, the control phase estimated error Δiw of a W− phase component of an error vector Δie (not shown in FIG. 14 and FIG. 15, but see FIG. 5) is large. Hence, the amount of convergence when the d-axis current estimated value id_est and the q-axis current estimated value iq_est converge to the d-axis current value id and the q-axis current value iq, respectively, becomes large.

On the other hand, as shown in FIG. 15, in the case where the angular movement Δθe of the electric angle θe is comparatively small, that is, the number of revolutions N of the AC motor 2 is small, the control phase estimated error Δiw of the W− phase component of the error vector Δie (not shown in FIG. 14 and FIG. 15) is small and hence the error vector Δie (see FIG. 5) is nearly perpendicular to the W− phase axis. Hence, the amount of convergence when the d-axis current estimated value id_est and the q-axis current estimated value iq_est converge to the d-axis current value id and the q-axis current value iq, respectively, becomes small. For this reason, in the case where the number of revolutions N of the AC motor 2 is small, the estimation accuracy of the d-axis current estimated value id_est and the q-axis current estimated value iq_est becomes worse in some cases as compared with the case where the number of revolutions N of the AC motor 2 is large.

Further, also in the case where the number of revolutions N of the AC motor 2 or the torque command value trq* is suddenly changed, the estimation accuracy of the d-axis current estimated value id_est and the q-axis current estimated value iq_est is likely to become worse.

Hence, in the present embodiment, in the case where the number of revolutions N of the AC motor 2 is small, the monitoring mode is inhibited and is switched to the monitoring stop mode, that is, the one-phase control is switched to the two-phase control. Similarly, in the case where the number of revolutions N of the AC motor 2 is suddenly changed and in the case where the torque command value trq* is suddenly changed, the monitoring mode is inhibited and is switched to the monitoring stop mode, that is, the one-phase control is switched to the two-phase control.

Figure 16:
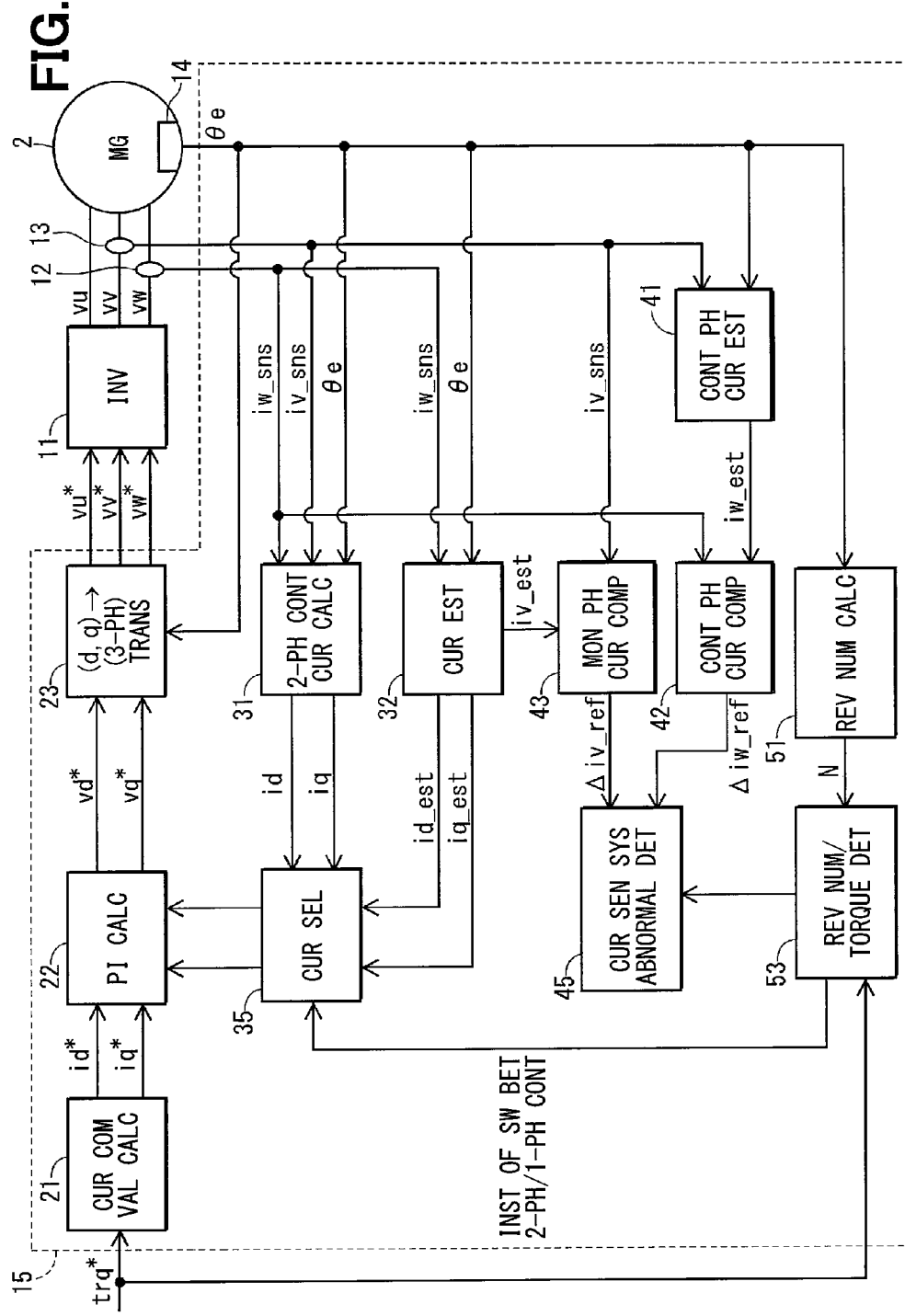
FIG. 16 is a block diagram to show a construction of an electric motor control device of the fifth embodiment of the present disclosure.

Specifically, as shown in FIG. 16, the control section 15 of the present embodiment has a number-of-revolutions calculation part 51 and a number-of-revolutions/torque determination part 53 additionally provided.

The number-of-revolutions calculation part 51 calculates the number of revolutions N of the AC motor 2 on the basis of the electric angle θe acquired from the rotation angle sensor 14.

The number-of-revolutions/torque determination part 53 determines whether or not the number of revolutions N of the AC motor 2 is larger than the specified determination value X. As described above, it is found that when the number of revolutions N of the AC motor 2 is small, for example, the motor is locked, the estimation accuracy of estimating the d-axis current estimated value id_est and the q-axis current estimated value iq_est from the control phase current sensed value iw_sns becomes worse. Further, various values are expressed by discrete values in the control section 15, so that even if the AC motor 2 is not completely stopped, the estimation accuracy is likely to become worse within a range of a given low rotation. Hence, in the present embodiment, in the case where the number of revolutions N is not larger than the specified determination value X, the two-phase control is performed. Here, the determination value X of the number of revolutions N of the AC motor 2 can be set appropriately at the number of revolutions N which makes the estimation accuracy of the d-axis current estimated value id_est and the q-axis current estimated value iq_est excellent, for example, 1500 rpm. Here, the determination value X of the number of revolutions N of the AC motor 2 is varied also by the number of poles and hence is set appropriately in consideration of the number of poles.

Further, the number-of-revolutions/torque determination part 53 determines whether or not the number of revolutions N of the AC motor 2 is suddenly changed. Still further, the number-of-revolutions/torque determination part 53 determines whether or not the torque command value trq* is suddenly changed. In the case where the number of revolutions N of the AC motor 2 or the torque command value trq* is suddenly changed, the estimation accuracy of the d-axis current estimated value id_est and the q-axis current estimated value iq_est is likely to become worse and hence the two-phase control is performed in the present embodiment. As to a determination of whether or not the number of revolutions N of the AC motor 2 is suddenly changed, for example, if the difference between the last value and the present value (that is, the degree of change) is larger than a threshold value, it is determined that the number of revolutions N of the AC motor 2 is suddenly changed. Further, whether or not the number of revolutions N of the AC motor 2 is suddenly changed may be determined on the basis of the difference between a maximum value and a minimum value in a given period (for example, several tens msec) or the difference between a maximum value and a minimum value of a moving average in a given period. The determination of whether or not the torque command value trq* is suddenly changed is also made in the same way.

Here, the switching determination processing according to the present embodiment will be described on the basis of FIG. 17. Here, the whole of the current feedback processing is the same as the first embodiment and hence its description will be omitted.

Figure 8:
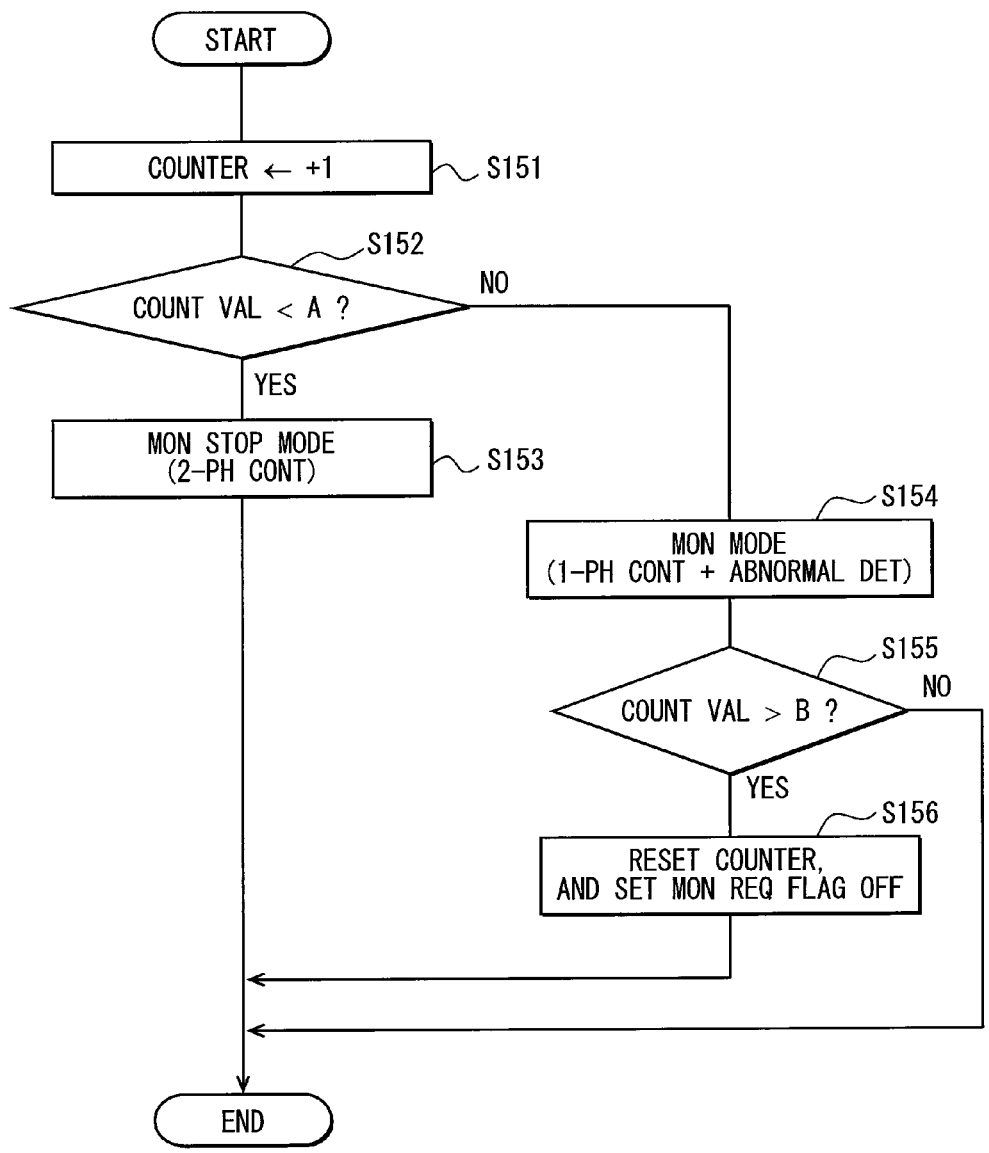
FIG. 8 is a flow chart to show switching determination processing of the first embodiment of the present disclosure.

In the switching determination processing performed after S104 shown in FIG. 7, S171 is the same as S151 shown in FIG. 8 and hence its description will be omitted.

In S172, it is determined whether or not the count value C is smaller than the two-phase/one-phase switching determination value A. The two-phase/one-phase switching determination value A is assumed to be a count value corresponding to a period (for example, several tens msec) during which the two-phase control is continuously performed. If it is determined that the count value C is smaller than the two-phase/one-phase switching determination value A (S172: YES), the procedure proceeds to S178. If it is determined that the count value C is not smaller than the two-phase/one-phase switching determination value A (S172: NO), the procedure proceeds to S173.

In S173, the number of revolutions N of the AC motor 2 is calculated on the basis of the electric angle θe.

In S174, it is determined whether or not the number of revolutions N of the AC motor 2 is larger than the specified determination value X. If it is determined that the number of revolutions N of the AC motor 2 is not larger than the specified determination value X (S174: NO), the procedure proceeds to S177. If it is determined that the number of revolutions N of the AC motor 2 is larger than the specified determination value X (S174: YES), the procedure proceeds to S175.

In S175, it is determined whether or not the number of revolutions N of the AC motor 2 is suddenly changed. If it is determined that the number of revolutions N of the AC motor 2 is suddenly changed (S175: YES), the procedure proceeds to S177. If it is determined that the number of revolutions N of the AC motor 2 is not suddenly changed (S175: NO), the procedure proceeds to S176.

In S176, it is determined whether or not the torque command value trq* is suddenly changed. If it is determined that the torque command value trq* is suddenly changed (S176: YES), the procedure proceeds to S177. If it is determined that the torque command value trq* is not suddenly changed (S176: NO), the procedure proceeds to S178.

In S177, the monitoring mode is inhibited and the procedure proceeds to S178. That is, the one-phase control is stopped and the detection of an abnormality of the control phase current sensor 12 and the monitor phase current sensor 13 is stopped.

The pieces of processing of S178 to S181 are the same as the pieces of processing of S153 to S156 shown in FIG. 8 and hence their descriptions will be omitted.

Figure 18:
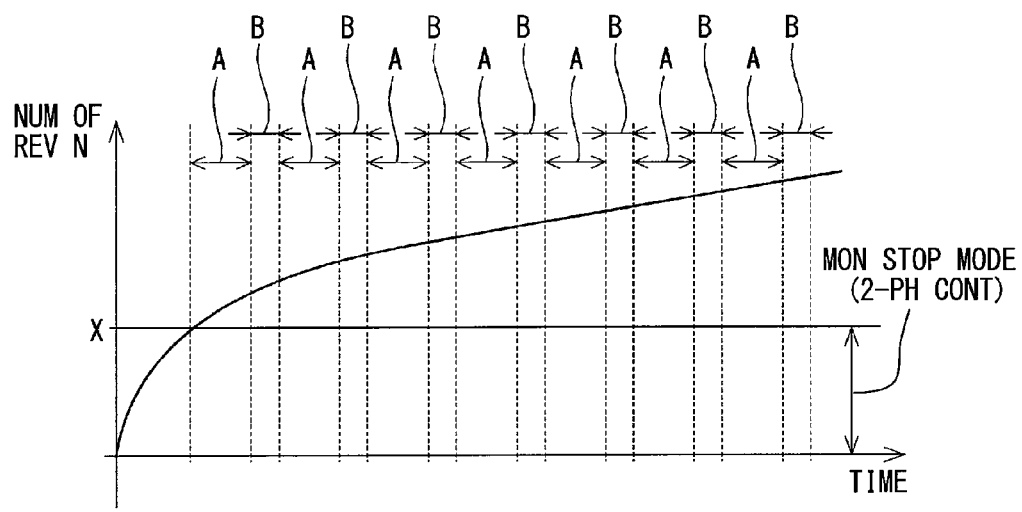
FIG. 18 is an illustration to illustrate a switching timing of the fifth embodiment of the present disclosure.

As shown in FIG. 18, in the present embodiment, within a range in which the estimation accuracy of the d-axis current estimated value id_est and the q-axis current estimated value iq_est is likely to become worse, that is, within a range in which the number of revolutions N of the AC motor 2 is not larger than the determination value X, the two-phase control is performed. Within a range in which the number of revolutions N of the AC motor 2 is larger than the determination value X, in the period corresponding to the two-phase/one-phase switching determination value A, the monitoring stop mode, that is, the two-phase control is performed, and in the period corresponding to the one-phase/two-phase switching determination value B, the monitoring mode, that is, the one-phase control is performed and an abnormality of the control phase current sensor 12 and the monitor phase current sensor 13 is detected. In FIG. 18, when the number of revolutions N of the AC motor 2 is larger than the specified determination value X, the monitoring stop mode is performed first, but the order may be inverted, that is, when the number of revolutions N of the AC motor 2 is larger than the specified determination value X, the monitoring mode may be performed first.

Further, although not shown in FIG. 18, even in the case where the number of revolutions N of the AC motor 2 is larger than the specified determination value X, in the case where the number of revolutions N of the AC motor 2 or the torque command value trq* is suddenly changed, even if the monitoring mode (the one-phase control+detection of an abnormality of the control phase current sensor 12 and the monitor phase current sensor 13) is performed, the monitoring mode (one-phase control) is switched appropriately to the monitoring stop mode (two-phase control).

In the present embodiment, the number-of-revolutions calculation part 51 calculates the number of revolutions N of the AC motor 2 on the basis of the electric angle θe. Further, the number-of-revolutions/torque determination part 53 determines whether or not the number of revolutions N is not larger than the specified determination value X (S174), and if it is determined that the number of revolutions N is not larger than the specified determination value X (S174: NO), the current selection part 35 inhibits the monitoring mode (S177) and switches the monitoring mode to the monitoring stop mode (S178). At the time of low rotation in which the estimation accuracy of the d-axis current estimated value id_est and the q-axis current estimated value iq_est is likely to become worse, the d-axis current value id and the q-axis current value iq are directly calculated not by the use of the d-axis current estimated value id_est and the q-axis current estimated value iq_est but by the use of the control phase current sensed value iw_sns and the monitor phase current sensed value iv_sns, and the AC motor 2 is controlled on the basis of the voltage command values vd*, vq* which are calculated on the basis of the d-axis current value id and the q-axis current value iq. Hence, it is possible to further prevent the controllability of the AC motor from being impaired.

Further, the number-of-revolutions/torque determination part 53 determines whether or not the number of revolutions N of the AC motor 2 is suddenly changed (S175). If it is determined the number of revolutions N of the AC motor 2 is suddenly changed (S175: YES), the current selection part 35 inhibits the monitoring mode (S177) and switches the monitoring mode to the monitoring stop mode (S178). In this way, even when the number of revolutions N of the AC motor 2 is suddenly changed, that is, when the estimation accuracy of the d-axis current estimated value id_est and the q-axis current estimated value iq_est is likely to become worse, the d-axis current value id and the q-axis current value iq are directly calculated not by the use of the d-axis current estimated value id_est and the q-axis current estimated value iq_est but by the use of the control phase current sensed value iw_sns and the monitor phase current sensed value iv_sns, and the AC motor 2 is controlled on the basis of the voltage command values vd*, vq* which are calculated on the basis of the d-axis current value id and the q-axis current value iq. Hence, it is possible to still further prevent the controllability of the AC motor from being impaired.

Still further, the number-of-revolutions/torque determination part 53 determines whether or not the torque command value trq* relating to torque generated by the drive of the AC motor 2 is suddenly changed. If it is determined that the torque command value trq* is suddenly changed (S176: YES), the current selection part 35 inhibits the monitoring mode (S177) and switches the monitoring mode to the monitoring stop mode (S178). In this way, even when the torque command value trq* is suddenly changed, that is, when the estimation accuracy of the d-axis current estimated value id_est and the q-axis current estimated value iq_est is likely to become worse, the d-axis current value id and the q-axis current value iq are directly calculated not by the use of the d-axis current estimated value id_est and the q-axis current estimated value iq_est but by the use of the control phase current sensed value iw_sns and the monitor phase current sensed value iv_sns, and the AC motor 2 is controlled on the basis of the voltage command values vd*, vq* which are calculated on the basis of the d-axis current value id and the q-axis current value iq. Hence, it is possible to still further prevent the controllability of the AC motor from being impaired.

Further, the same effect as the embodiments described above can be produced.

In the present embodiment, the control section 15 constructs "a number-of-revolutions calculation means", "a number-of-revolutions determination means", "a number-of-revolutions sudden-change determination means", and "a torque sudden-change determination means". In more detail, the number-of-revolutions calculation part 51 constructs "a rotation angle acquisition means" and "the number-of-revolutions calculation means", and the number-of-revolutions/torque determination part 53 constructs "the number-of-revolutions determination means", "the number-of-revolutions sudden-change determination means", and "the torque sudden-change determination means".

Figure 17:
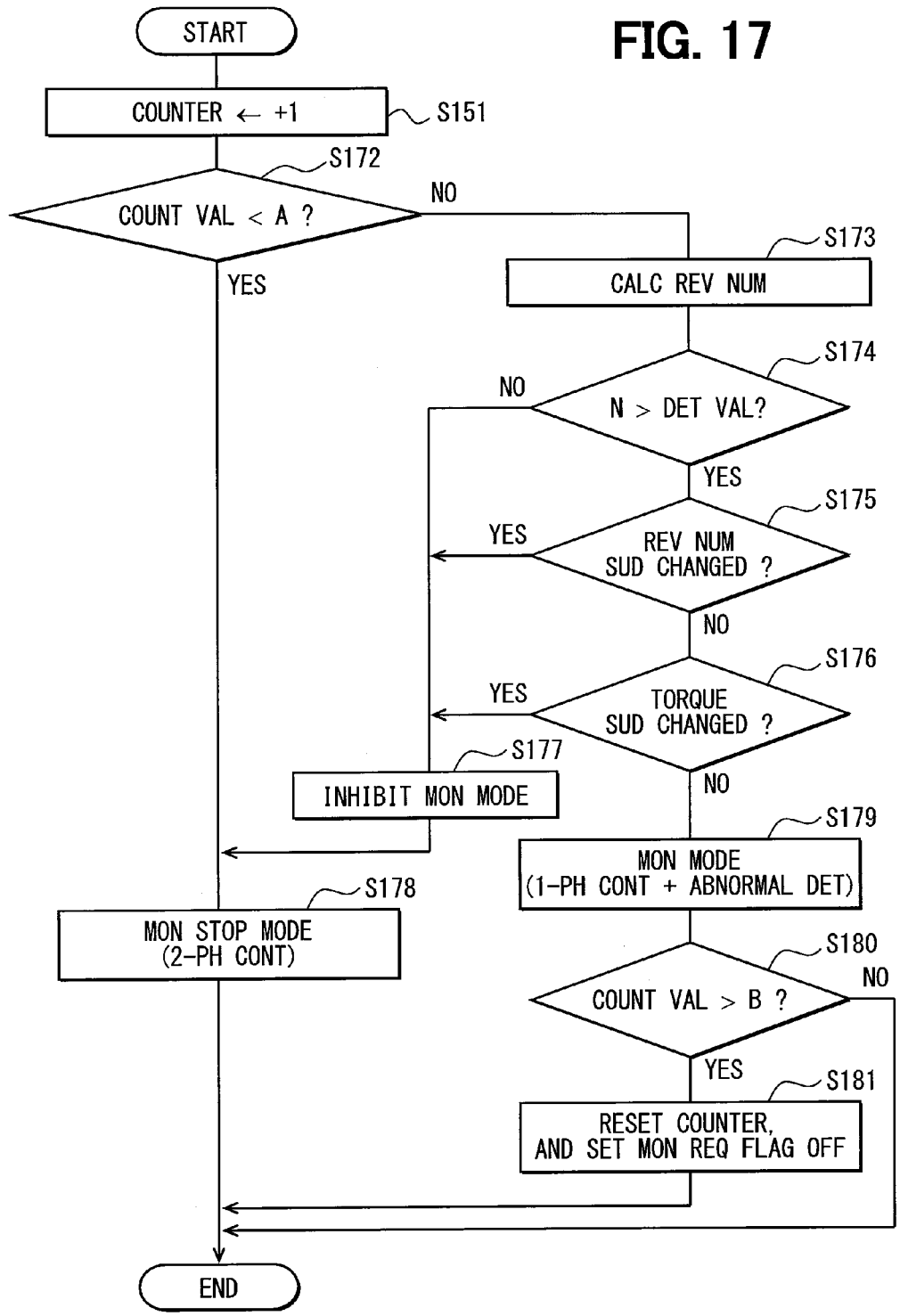
FIG. 17 is a flow chart to show switching determination processing of the fifth embodiment of the present disclosure.

Further, S173 shown in FIG. 17 corresponds to processing as a function of "the number-of-revolutions calculation means", and S174 corresponds to processing as a function of "the number-of-revolutions determination means", and S175 corresponds to processing as a function of "the number-of-revolutions sudden-change determination means", and S176 corresponds to processing as a function of "the torque sudden-change determination means".

Sixth Embodiment

A sixth embodiment is different from the first embodiment only in the calculation method in the current estimation part 32, and hence this point will be mainly described and the descriptions of the other constructions will be omitted.

In the first embodiment, by integrating the correction vector (Δid, Δiq) in the control phase direction, the convergence of the d-axis current estimated value id_est to the d-axis current value id and the convergence of the q-axis current estimated value iq_est to the q-axis current value iq are enhanced. In other words, in the respective embodiments described above, the d-axis current estimated value id_est and the q-axis current estimated value iq_est are corrected in the control phase direction. In the present embodiment, in order to enhance the convergence of the d-axis current estimated value id_est to the d-axis current value id and the convergence of the q-axis current estimated value iq_est to the q-axis current value iq, the d-axis current estimated value id_est and the q-axis current estimated value iq_est are corrected also in a direction perpendicular to the control phase direction.

Figure 19:
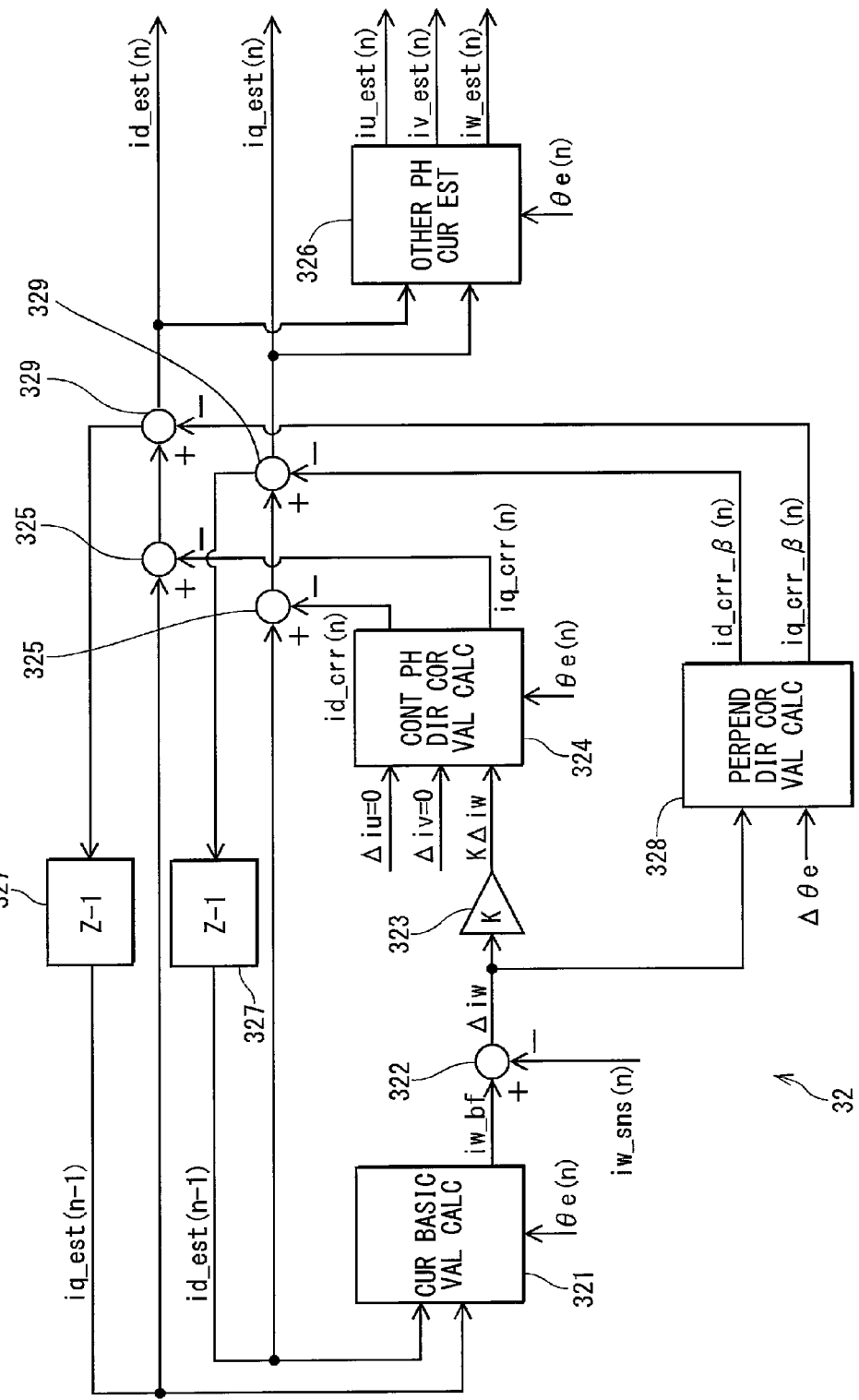
FIG. 19 is a block diagram to show a construction of a current estimation part according to a sixth embodiment of the present disclosure.
Figure 20:
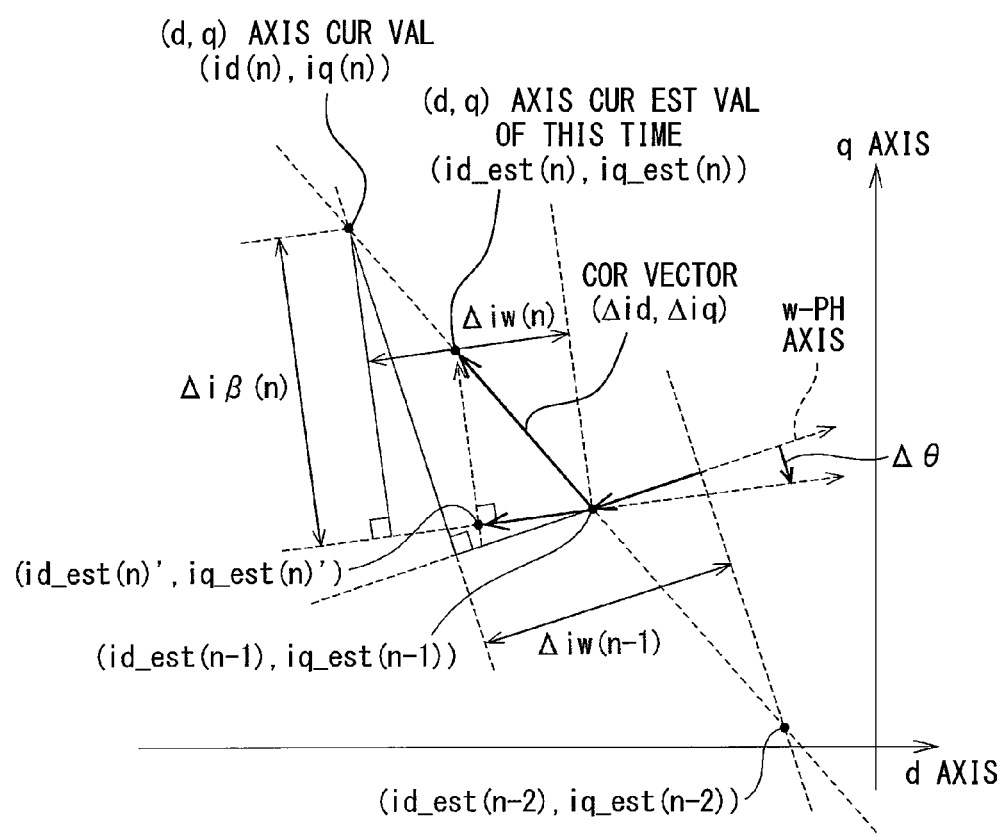
FIG. 20 is an illustration to illustrate a current estimation according to the sixth embodiment of the present disclosure.

In more detail, as shown in FIG. 19, the current estimation part 32 further has a perpendicular direction correction value calculation part 328. An asymptotic equation expressing calculation in the current estimation part 32 of the present embodiment is expressed by an equation (6). When the asymptotic equation shown by the equation (6) is expressed by a vector diagram, the vector diagram shown in FIG. 20 is acquired.

[Mathematical formula 4]

$$\begin{bmatrix} \text{id\_est}(n) \\ \text{iq\_est}(n) \end{bmatrix} = \begin{bmatrix} \text{id\_est}(n-1) \\ \text{iq\_est}(n-1) \end{bmatrix} - K \begin{bmatrix} \cos(\theta w(n)) \\ -\sin(\theta w(n)) \end{bmatrix} \Delta iw - \begin{bmatrix} \text{id\_crr\_}\beta(n) \\ \text{iq\_crr\_}\beta(n) \end{bmatrix} \quad (6)$$

$$\Delta i\beta = \frac{\cos\Delta\theta e}{\sin\Delta\theta e}\left\{\Delta iw(n) - \frac{1}{\cos\Delta\theta e}(1-K)\Delta iw(n-1)\right\} \quad (7)$$

$$\begin{bmatrix} \text{id\_crr\_}\beta(n) \\ \text{iq\_crr\_}\beta(n) \end{bmatrix} = K \begin{bmatrix} \cos(\theta w(n) + 90°) \\ -\sin(\theta w(n) + 90°) \end{bmatrix} \Delta i\beta \quad (8)$$

In the present embodiment, the control phase direction correction value calculation part 324 calculates the control phase direction correction values id_crr (n), iq_crr (n), and the subtractor 325 subtracts the control phase direction correction value id_crr (n) from the last d-axis current estimated value id_est (n−1) and subtracts the control phase direction correction value iq_crr (n) from the last q-axis current estimated value iq_est (n−1) to thereby calculates a d-axis current provisional estimated value id_est' (n) and a q-axis current provisional estimated value iq_est' (n), respectively. The d-axis current provisional estimated value id_est' (n) and the q-axis current provisional estimated value iq_est' (n) are the same as the d-axis current estimated value id_est (n) and a q-axis current estimated value iq_est (n) of the first embodiment.

The perpendicular direction correction value calculation part 328 estimates a β-axis estimated error Δiβ of a component perpendicular to the control phase on the basis of an equation (7). Further, the perpendicular direction correction value calculation part 328 calculates a perpendicular direction correction values id_crr_β (n) and iq_crr_β (n) by the dq transformation by the use of the β-axis estimated error Δiβ (see an equation (8)).

The subtractor 329 subtracts the calculated perpendicular direction correction value id_crr_β (n) from the d-axis current provisional estimated value id_est' (n) and subtracts the calculated perpendicular direction correction values iq_crr_β (n) from the q-axis current provisional estimated value iq_est' (n) to thereby calculate the d-axis current estimated value id_est and the q-axis current estimated value iq_est, respectively (see equation (6)).

In the present embodiment, the current estimation part 32 calculates the d-axis current estimated value id_est and the q-axis current estimated value iq_est by integrating the control phase direction correction values id_crr (n), iq_crr (n) and the perpendicular direction correction values id_crr_β(n), iq_crr_β (n), which are calculated on the basis of the current basic value iw_bf and the control phase current sensed value iw_sns which are control phase components of the d-axis current estimated value id_est and the q-axis current estimated value iq_est which are calculated in the last calculation. In more detail, in the present embodiment, the current estimation part 32 integrates the correction vector (Δid, Δiq) on the (d, q) axis plane, the correction vector (Δid, Δiq) being composed of the control phase direction correction values id_crr (n), iq_crr (n) and the perpendicular direction correction values id_crr_β (n), iq_crr_β (n) which are perpendicular to the control phase direction.

In this method, the d-axis current estimated value id_est and the q-axis current estimated value iq_est can be corrected also in the direction perpendicular to the control phase direction. However, the amount of correction in the direction perpendicular to the control phase direction is calculated from the amount of change in the electric angle and hence an accuracy is likely to become worse in the range in which the number of revolutions is low, so that the two-phase control is performed in the range in which the number of revolutions is low.

In this way, by the use of the control phase direction correction values id_crr (n), iq_crr (n) rotating with the rotation of the AC motor 2 and the perpendicular direction correction values id_crr_β (n), iq_crr_β (n), the d-axis current estimated value id_est and the q-axis current estimated value iq_est can be calculated with high accuracy. Further, the same effects as the embodiments described above can be produced.

The current estimation method of the sixth embodiment may be used as the current estimation method of any one of the first to the fifth embodiments.

In the present embodiment, the correction vector (Δid, Δiq) composed of the control phase direction correction values id_crr (n), iq_crr (n) and the perpendicular direction correction values id_crr_β (n), iq_crr_β (n) corresponds to "the correction vector". Further, subtracting the control phase direction correction values id_crr (n), iq_crr (n) and the perpendicular direction correction values id_crr_β (n), iq_crr_β (n) from the d-axis current estimated value id_est (n−1) and the q-axis current estimated value iq_est (n−1) in terms of vector by the use of the subtractors 325, 329 corresponds to "integrating the correction vector on the (d, q) axis plane".

Seventh Embodiment

A seventh embodiment and an eighth embodiment are different from the embodiments described above only in a calculation method in the current estimation part 32, so that this point will be mainly described and the descriptions of the other constructions will be omitted.

In the embodiments described above, the d-axis current estimated value id_est and the q-axis current estimated value iq_est are calculated by integrating the correction vector (Δid, Δiq). In the seventh embodiment, the d-axis current estimated value id_est and the q-axis current estimated value iq_est are calculated by the use of the d-axis current command value id* and the q-axis current command value iq*.

In the present embodiment, the control phase current sensed value iw_sns is used as the W− phase current of the equation (1). Further, a U− phase current command value iu* and a V− phase current command value iv*, which are three-phase current command values calculated from the inverse dq transformation of the d-axis current command value id* and the q-axis current command value iq*, are used as an U-phase current iu and a V- phase current iv. Further, it is also recommended to employ a method of using one of the U-phase current command value iu* and the V- phase current command value iv* and of keeping that the sum of three-phase current command values=0.

Figure 21A:
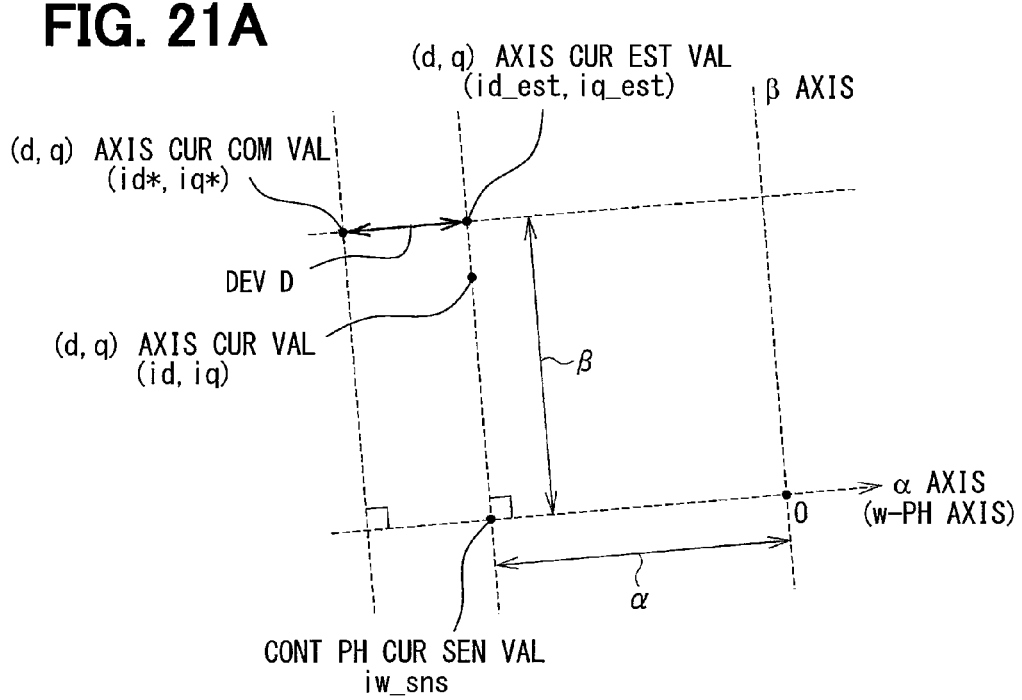
FIGS. 21A and 21B are illustrations to illustrate a current estimation method according to a seventh embodiment of the present disclosure.

A current estimation method using the d-axis current command value id* and the q-axis current command value iq* will be described on the basis of FIGS. 21A and 21B. FIG. 21A shows a coordinate system having a W- phase axis of the control phase as an α axis and having a direction perpendicular to the W- phase axis as a β axis, and this (α, β) axis coordinate system rotates relatively in the (d, q) axis coordinate system (not shown) of a rotating coordinate system. Here, the d-axis current estimated value id_est and the q-axis current estimated value iq_est are calculated in terms of vector from the control phase current sensed value iw_sns and the U- phase current command value iu* and the V- phase current command value iv*, to which the d-axis current command value id* and the q-axis current command value iq* are transformed by the inverse dq transformation. The deviation D between the calculated (d, q) axis current command value (id*, iq*) and the (d, q) axis current estimated value (id_est, iq_est), which is calculated in terms of vector, is surely in the control phase current direction (in a W-axis direction in this example). Hence, in the PI calculation in the PI calculation part 22 shown in FIG. 3, a voltage operation is performed on the basis of an actual control phase current sensed value iw_sns, so that the voltage operation is performed only in the W- phase axis direction of high reliability and is not performed in the other directions of comparatively low reliability (U- phase direction and V- phase direction). Therefore, it is possible to prevent an abnormal voltage from being outputted because of an estimated error of the current estimated value and hence to perform a safe operation.

Figure 21B:
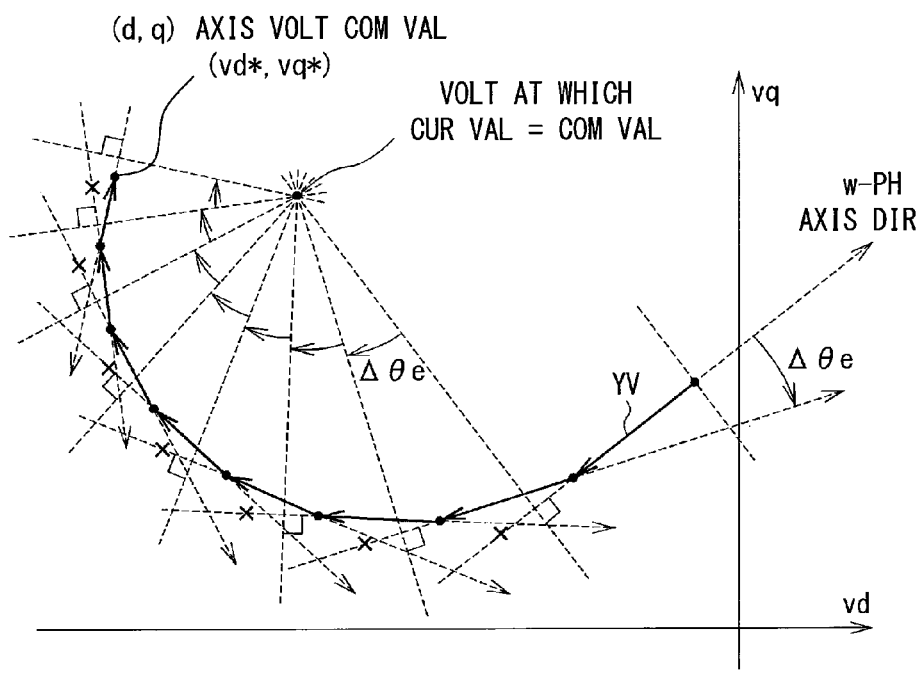

Thus, as shown in FIG. 21B, by the use of the W- phase axis, shown by broken arrows, relatively rotating along with the rotation of the AC motor 2 on the (d, q) axis plane of the rotating coordinate system, the voltage command values vd*, vq* are made asymptotic to voltages required for the d-axis current estimated value id_est and the q-axis current estimated value iq_est to be equal to the d-axis current command value id* and the q-axis current command value iq*. Hence, if the angular movement Δθe of each sensor cycle (for example, 100 μsec) is larger than a given value, in other words, the number of revolutions N is the given determination value or more, the voltage command values vd*, vq* are asymptotic to desired values, so that the AC motor 2 can be controlled with high accuracy.

In this regard, in FIG. 21B, the arrows YV show the movement of a first term of the voltage command values vd*, vq* calculated by the PI calculation. Further, a reference symbol "X" shows the voltage command values vd*, vq* including also a P term.

Eighth Embodiment

In an eighth embodiment, a control phase basic current phase φ is calculated by the use of the d-axis current command value id* and the q-axis current command value iq*, and the d-axis current estimated value id_est and the q-axis current estimated value iq_est are calculated on the basis of the calculated control phase basic current phase φ.

Figure 22:
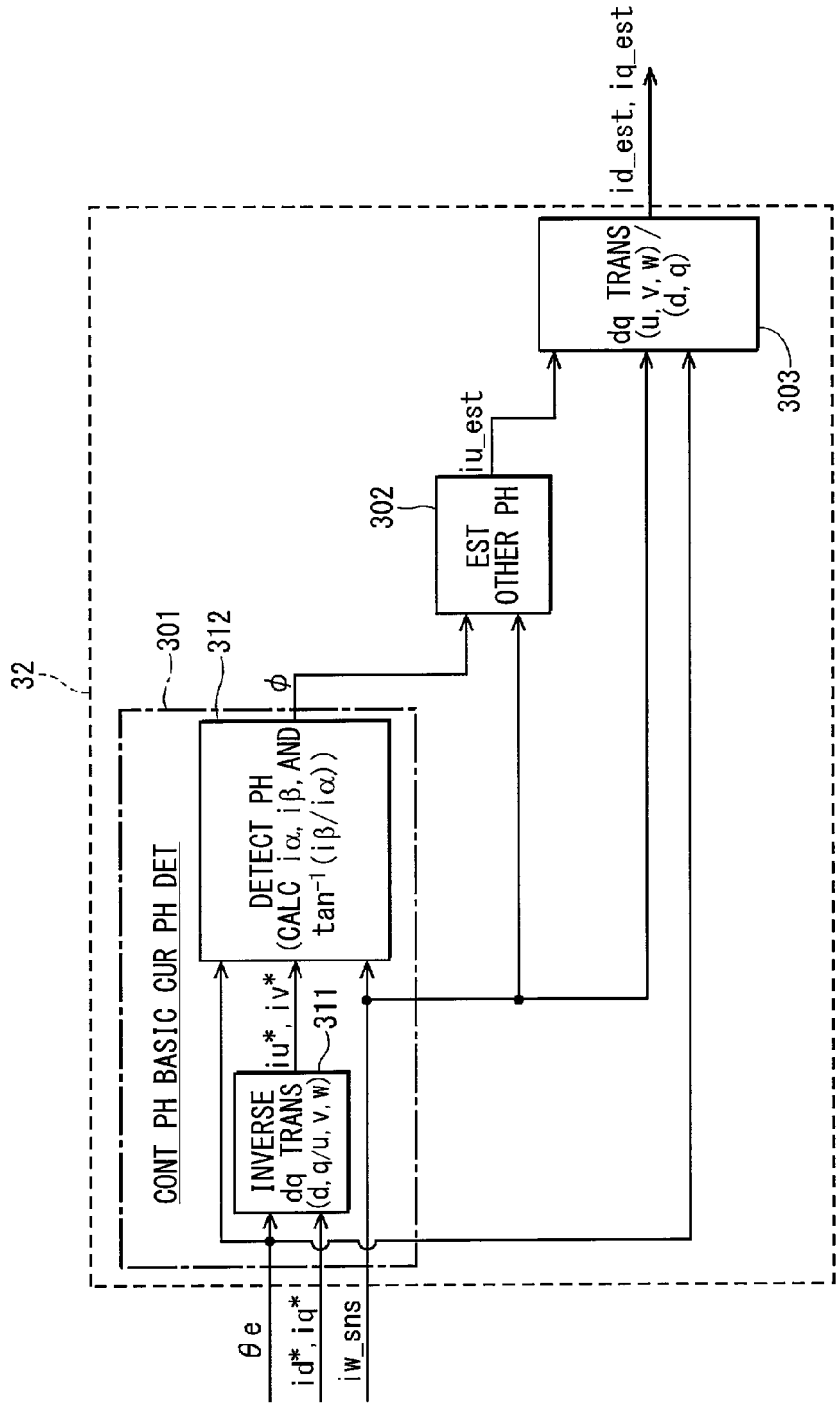
FIG. 22 is a block diagram to show a construction of a current estimation part according to an eighth embodiment of the present disclosure.

As shown in FIG. 22, the current estimation part 32 has a control phase basic current phase detection part 301, an other phase estimation part 302, and a dq transformation part 303.

The control phase basic current phase detection part 301 has an inverse dq transformation part 311 and a phase detection part 312.

First, the inverse dq transformation part 311 inversely dq-transforms the d-axis current command value id* and the q-axis current command value iq* by the use of the electric angle θe to thereby calculate the U- phase current command value iu* and the V- phase current command value iv*.

The phase detection part 312 calculates a control phase basic current phase φ on the basis of the V- phase current command value iv*, which is calculated by the inverse dq transformation part 311, and the control phase current sensed value iw_sns. Here, when the W- phase axis of the control phase is made an α axis and a direction perpendicular to the α axis is made a β axis, an α-axis current iα and a β-axis current iβ are expressed by equations (9), (10).

[Mathematical formula 5]

$$i\alpha = K \times \frac{3}{2} \times \text{iw\_sns} \quad (9)$$

$$i\beta = K \times \left( \frac{\sqrt{3}}{2} \times iu^* - \frac{\sqrt{3}}{2} iv^* \right) \quad (10)$$

Here, the equation (10) may be modified by the use of the Kirchhoff's law in such a way as to include the control phase current sensed value iw_sns so as to include a component of the W phase of the control phase. When the equation (10) includes the component of the W phase of the control phase, the estimation accuracy can be enhanced.

The control phase basic current phase φ is expressed by the following equation (11) using the α-axis current iα and the β-axis current iβ.

[Mathematical formula 6]

$$\phi = \tan^{-1}\left(\frac{i\beta}{i\alpha}\right) \quad (11)$$

The other phase estimation part 302 calculates an estimated phase current estimated value iu_est on the basis of the control phase basic current phase φ, which is calculated by the phase detection part 312, and the control phase current sensed value iw_sns (see equation (12)). In this regard, Ia in the equation (12) is an amplitude but is not required to be calculated because Ia is a coefficient that is not finally included.

[Mathematical formula 7]

$$\begin{aligned} \text{iu\_est} &= Ia \times \sin(\phi - 120°) \\ &= -\frac{1}{2} \times Ia \times \sin(\phi) - \frac{\sqrt{3}}{2} \times Ia \times \cos(\phi) \\ &= -\frac{1}{2} \times \text{iw\_sns} - \frac{\sqrt{3}}{2} \times \frac{Ia \times \sin(\phi)}{\tan(\phi)} \\ &= \left\{ -\frac{1}{2} - \frac{\sqrt{3}}{2} \times \frac{1}{\tan(\phi)} \right\} \times \text{iw\_sns} \end{aligned} \quad (12)$$

The dq transformation part 303 calculates the d-axis current estimated value id_est and the q-axis current estimated value iq_est by the dq transformation on the basis of the estimated phase current estimated value iu_est, the control phase current sensed value iw_sns, and the electric angle θe.

Here, when the control phase current sensed value iw_sns becomes 0 A, or the tangent tan(φ) of the control phase basic current phase φ reaches an infinite value, the calculation of "multiplying a number by 0" is caused in the equation (12). Further, when the tangent tan(φ) of the control phase basic current phase φ becomes 0, the calculation of "dividing a number by 0" is caused in the equation (12). For this reason, the estimated phase current estimated value iu_est is likely to be varied. Hence, within a zero cross range, zero cross correction processing of masking the calculation of "multiplying a number by 0" and "dividing a number by 0" may be performed. As the zero cross correction processing, for example, a d-axis current deviation and a q-axis current deviation are forcibly made 0 A, whereby the d-axis voltage command value vd* and the q-axis voltage command value vq* are fixed. Alternatively, the d-axis voltage command value vd* and the q-axis voltage command value vq* may be held at the last values, thereby being directly fixed.

Even in the case where the d-axis current estimated value id_est and the q-axis current estimated value iq_est are calculated in this way by the use of the control phase basic current phase φ, similarly to the seventh embodiment, as shown in FIG. 21B, the voltage command values vd*, vq* are asymptotic to desired values, so that the AC motor 2 can be controlled with high accuracy.

In this regard, an example in which the U− phase current is estimated has been described here, but a method for estimating a monitor phase current estimated value iv_est from a control phase current sensed value iw_sns is performed in the same way. Further, a method for estimating a U− phase current or a W− phase current (control phase current estimated value iw_est) by the use of the monitor phase current sensed value iv_sns is performed in the same way, and hence their descriptions will be omitted. Further, it is assumed that the control phase current estimation part 41 also performs the same calculation.

In the present embodiment, the monitor phase current estimated value iv_est is calculated on the basis of the current command values id*, iq* in addition to the control phase current sensed value iw_sns and the electric angle θe. Further, the control phase current estimated value iw_est is calculated on the basis of the current command values id*, iq* in addition to the monitor phase current sensed value iv_sns and the electric angle θe.

Further, in the seventh embodiment and the eighth embodiment, the current estimation part 32 calculates the d-axis current estimated value id_est and the q-axis current estimated value iq_est on the basis the d-axis current command value id* and the q-axis current command value iq*, the control phase current sensed value iw_sns, and the electric angle θe, which are related to the drive of the AC motor 2. Further, the PI calculation part 22 calculates the voltage command values vd*, vq* by which the (d, q) axis current estimated value (id_est, iq_est) is made equal to the (d, q) axis current command value (id*, iq*) in terms of vector by integrating the deviation D between the (d, q) axis current command value (id*, iq*) and the (d, q) axis current estimated value (id_est, iq_est), which is in the control phase (W phase in the present embodiment) rotating the (d, q) axis plane of the rotating coordinate system, in terms of vector.

In the seventh embodiment and the eighth embodiment, when the currents are estimated on the basis of the control phase current sensed value iw_sns and the electric angle θe, the d-axis current estimated value id_est and the q-axis current estimated value iq_est can be calculated with high accuracy on the basis of the d-axis current command value id* and the q-axis current command value iq*. In this way, also in the seventh embodiment and the eighth embodiment, the same effects as the embodiments described above can be produced.

In this regard, in the fourth embodiment and the fifth embodiment, the d-axis current command value id* and the q-axis current command value iq* correspond to the "current command value".

The current estimation method in the seventh embodiment and the eighth embodiment may be the current estimation method in any one of the first to the fifth embodiments.

Other Embodiments (A) In the embodiments described above, the method of integrating a correction vector (Δid, Δiq) and the method of using the current command values id*, iq* have been described as the method of calculating the d-axis current estimated value id_est and the q-axis current estimated value iq_est which are two-phase control current values. In the other embodiments, the d-axis current estimated value id_est and the q-axis current estimated value iq_est, the monitor phase current estimated value iv_est, and the control phase current estimated value iw_est may be calculated by any method. Here, in the case where the control device of an AC motor is applied to a system in which the AC motor needs to be controlled at high speed and with high accuracy, for example, like a main motor of a hybrid vehicle or an electric vehicle, two-dimensional quantities necessary for the vector control need to be estimated with high accuracy, as is the case of the estimation method of the embodiments described above.

Further, in the embodiments described above, a calculation method in the control phase current estimation part is the same as a calculation method in the monitor phase current estimation part, but these methods may be different from each other.

(B) In the other embodiments, in the current estimation method of integrating a correction vector (Δid, Δiq), initial values in the calculation of the d-axis current estimated value id_est and the q-axis current estimated value iq_est may be the last-minute d-axis current value id and the last-minute q-axis current value iq. In this way, the error between the d-axis current estimated value id_est and the d-axis current value id and the error between the q-axis current estimated value iq_est and the q-axis current value iq when the two-phase control is switched to the one-phase control can be made smaller, which hence can prevent the control of the AC motor from being made unstable by the errors.

(C) In the embodiments described above, the rotation angle sensor senses the electric angle θe and outputs the electric angle θe to the control section. In the other embodiments, the rotation angle sensor may sense a mechanical angle θm and may output the mechanical angle θm to the control section and the mechanical angle θm may be converted into the electric angle θe in the control section. Further, in place of the electric angle θe, the mechanical angle θm may be made "the rotation angle sensed value". Still further, the number of revolutions N may be calculated on the basis of the mechanical angle θm.

(D) In the embodiments described above, whether or not the AC motor is driven within a low rotation range is determined on the basis of the number of revolutions N. In the other embodiments, whether or not the AC motor is driven within a low rotation range may be determined on the basis of an electric frequency in place of the number of revolutions N. For example, in the case where the number of poles of the AC motor is four, the number of revolutions 1500 rpm of the determination value shown by an example in the embodiments described above correspond to an electric frequency of 100 Hz and hence whether or not the AC motor is driven within a low rotation range may be determined on the basis of the electric frequency.

(E) In the embodiments described above, the abnormality of the control phase current sensor and the monitor phase current sensor is detected on the basis of the control phase difference reference value Δiw_ref and the monitor phase difference reference value Δiv_ref, the control phase difference reference value Δiw_ref being acquired by comparing the control phase current estimated value iw_est with the control phase current sensed value iw_sns by the control phase current comparison part, the monitor phase difference reference value Δiv_ref being acquired by comparing the monitor phase current estimated value iv_est with the monitor phase current sensed value iv_sns by the monitor phase current comparison part.

In the other embodiments, the monitor phase current comparison part may be omitted and the abnormality of the current sensor may be detected on the basis of only the control phase difference reference value Δiw_ref acquired by the control phase current comparison part. The calculation result of the control phase current estimation part for calculating the control phase current estimated value iw_est used by the control phase comparison part is not used for the current feedback control and hence is not affected by the interference of the current feedback control. Therefore, the abnormality of the control phase current sensor and the monitor phase current sensor can be adequately detected.

Further, in the other embodiments, the control phase current estimation part and the control phase current comparison part may be omitted and the abnormality of the control phase current sensor and the monitor phase current sensor may be detected on the basis of only the monitor phase difference reference value Δiv_ref by the monitor phase current comparison part. In this way, the amount of calculation relating to the detection of the abnormality of the control phase current sensor and the monitor phase current sensor can be reduced.

(F) In the fourth embodiment and the fifth embodiment described above, the two-phase control current calculation part and the current estimation part constantly perform the calculations. The other embodiments may be constructed, like the second embodiment, in such a way that: in the case where an abnormality determination request is made, the two-phase control current calculation part stops calculation; and in the case where an abnormality determination request is not made, the current estimation part stops the current estimation processing.

Further, in the fourth embodiment and the fifth embodiment described above, as is the case of the third embodiment, the current estimation part may start calculation at a specified timing before the two-phase control being switched to the one-phase control. In this way, the same effect as the embodiments described above can be produced. Here, in the case where the fourth embodiment is combined with the third embodiment, if both of the just-before determination value A1 and the change value A2 are smaller than the two-phase/one-phase switching determination value A, there is no restriction on the magnitude relationship between the just-before determination value A1 and the change value A2: that is, the just-before determination value A1 and the change value A2 may be equal to each other or may be different from each other; but it is desirable that the change value A2<the just-before determination value A1. Of course, the fourth embodiment may be combined with the fifth embodiment.

(G) In the fourth embodiment described above, in the case where the control phase deviation between the control phase current estimated value iw_est and the control phase current sensed value iw_sns, or the monitor phase deviation between the monitor phase current estimated value iv_est and the monitor phase current sensed value iv_sns is caused, the period of the two-phase control of the monitoring stop mode is shortened. In the other embodiments, in the case where the control phase deviation between the control phase current estimated value iw_est and the control phase current sensed value iw_sns, or the monitor phase deviation between the monitor phase current estimated value iv_est and the monitor phase current sensed value iv_sns is caused, the period during which the one-phase control and the abnormality detection are performed, that is, the period of the monitoring mode may be elongated. In other words, the one-phase/two-phase switching determination value relating to the period during which the one-phase control and the abnormality detection are performed may be changed to a change value B1 larger than B. Here, to elongate the period during which the one-phase control and the abnormality detection are performed is to relatively shorten the period during which the two-phase control is performed. In other words, "in the case where the control phase deviation between the control phase current estimated value iw_est and the control phase current sensed value iw_sns, or the monitor phase deviation between the monitor phase current estimated value iv_est and the monitor phase current sensed value iv_sns is caused, the period during which the monitoring stop mode is stopped is shortened". Further, the period of the two-phase control of the monitoring stop mode may be shortened and the period during which the one-phase control and the abnormality detection are performed, that is, the period of the monitoring mode may be elongated.

Further, in the other embodiments, the change value A2 may be varied in such a way that the period of the monitoring stop mode is shortened according to the magnitude of the control phase deviation between the control phase current estimated value iw_est and the control phase current sensed value iw_sns or the monitor phase deviation between the monitor phase current estimated value iv_est and the monitor phase current sensed value iv_sns, for example, as the control phase deviation or the monitor phase deviation becomes larger. Of course, the change value B1 may be varied.

Still further, in the case where the control phase deviation and the monitor phase deviation are small, or in the case where the control phase deviation and the monitor phase deviation are not caused, the period of the monitoring mode may be elongated.

(H) In the fifth embodiment described above, it is only necessary that at least one piece of determination processing of S174, S175, and S176 shown in FIG. 17 is performed, and other pieces of determination processing may be omitted.

(I) In the embodiments described above, the examples have been described in which the current sensors are disposed for two phases of three phases. In the other embodiments, in the case where the current sensors are disposed for three phases and where an abnormality is caused in any one phase and where the control is performed in two phases in which an abnormality is not caused, the above-mentioned feedback processing may be performed. In that case, it is only necessary that one phase of the two phases in which the abnormality is not caused is assumed to be the control phase and that the other phase is assumed to be the monitor phase. Here, the method of detecting an abnormality caused in one phase of the three phases and the method of specifying a phase in which an abnormality is caused may be any method.

(J) The inverter for controlling the voltage to be impressed on the AC motor may be controlled by any method, if the method can perform the current feedback control. For example, the inverter can be so constructed as to be controlled by adequately switching a sine wave PWM control mode, an over-modulated PWM control mode, and a square wave control mode. Here, in some cases, the square wave control mode is a mode of torque feedback control in which only the phase of voltage can be controlled, but the torque to be fed back can be estimated from the current and hence can be considered as "the current feedback control" in the broad sense of the term.

(K) In the embodiments described above, the two-phase control current values are assumed to be the d-axis current value id and the q-axis current value iq and the one-phase current estimated values for controlling are assumed to be the d-axis current estimated value id_est and the q-axis current estimated value iq_est. In the other embodiments, the two-phase control current values and the one-phase current estimated value for controlling are not only limited to the d-axis current value id and the q-axis current value iq and the d-axis current estimated value id_est and the q-axis current estimated value iq_est but may be the respective phase currents and the current values based on the other axes, if they are current values to be used for the current feedback control. Here, "one-phase current estimated value for controlling" shows the current estimated value estimated from the current sensed value of one phase so as to be used for the current feedback control. Further, "one-phase current estimated value for monitoring" shows the current estimated value estimated from the current sensed value of one phase so as to detect the abnormality of the current sensor.

(L) In the embodiments described above, the AC motor is a three-phase permanent magnet synchronous motor, but in the other embodiments, an induction motor or the other synchronous motor may be used for the AC motor. Further, the AC motor in the embodiment described above is a so-called motor generator having both of a function as an electric motor and a function as a generator, but in the other embodiments, the AC motor may be an electric motor not having the function as the generator.

The AC motor may be constructed in such a way as to operate as the electric motor for the engine and to start the engine. Further, the engine may be not disposed. Still further, a plurality of AC motors may be disposed and a power dividing mechanism for dividing power in the plurality of AC motors may be further disposed.

(M) The control device of an AC motor according to the present disclosure may be applied not only to a system having one set of inverter and AC motor, as described in the embodiments, but also to a system having two or more sets of inverter and AC motor. Further, the control device of an AC motor according to the present disclosure may be applied to a system of an electric train having a plurality of AC motors connected in parallel to one inverter.

Still further, the control device of an AC motor is applied to the electric vehicle but may be applied to an object other than the electric vehicle.

As described above, the present disclosure is not limited to the embodiments described above but can be put into practice in various modes within a range not departing from the gist of the present disclosure.

The above disclosure has the following aspects.

According to an aspect of the present disclosure, a control device for controlling and driving a three-phase alternate current motor, which has an impressed voltage controlled by an inverter, includes: a control phase current acquisition means for acquiring a control phase current sensed value from a control phase current sensor, which is disposed on a control phase as one of three phases of the alternate current motor; a monitor phase current acquisition means for acquiring a monitor phase current sensed value from a monitor phase current sensor, which is disposed on a monitor phase as another one of the three phases different from the control phase; a rotation angle acquisition means for acquiring a rotation angle sensed value from a rotation angle sensor for sensing a rotation angle of the alternate current motor; a current calculation means for calculating a two-phase control current value based on the control phase current sensed value, the monitor phase current sensed value and the rotation angle sensed value; a current estimation means for calculating a one-phase current estimated value for controlling the alternate current motor based on the control phase current sensed value and the rotation angle sensed value; a voltage command value calculation means for calculating a voltage command value relating to a voltage to be impressed on the inverter based on the two-phase control current value or the one phase current estimated value for controlling the alternate current motor; an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on the monitor phase current estimated value and the rotation angle sensed value; an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value; and a switching means for switching between a monitoring stop mode, in which the voltage command value is calculated based on the two-phase control current value, and a monitoring mode, in which the voltage command value is calculated based on the one-phase current estimated value for controlling the alternate current motor, and the abnormality detection means detects the abnormality, at predetermined time intervals.

The above control device has the abnormality detection means and hence can suitably detect an abnormality being caused in at least one of the control phase current sensor and the monitor phase current sensor. Further, the above device focuses attention on the fact that a detected value for detecting an abnormality does need to be constantly detected and has the current sensor disposed for two phases of three phases. The monitoring stop mode and the monitoring mode are switched from each other at specified intervals, the monitoring stop mode calculating the voltage command value by the use of the two-phase control current values based on the current sensed values of two phases of the control phase and the monitor phase, the monitoring mode calculating the voltage command value by the use of the one-phase current estimated value for controlling, which is based on the current sensed value of one phase of the control phase, and detecting an abnormality of the control phase current sensor and the monitor phase current sensor.

In other words, the above device performs the current feedback control at high speed and with high accuracy by the use of two-phase control current values based on the current sensed values of two phases in the monitoring stop mode and switches the monitoring stop mode to the monitoring mode at specified intervals. The above device does not use the monitor phase current sensed value for the current feedback control in the monitoring mode and performs the current feedback control by the use of the one-phase current estimated values for controlling to thereby prevent the current feedback control from interfering with the monitor phase current sensed value and detects an abnormality of the current sensor.

The above device detects an abnormality of the control phase current sensor and the monitor phase current sensor on the basis of the comparison result of the current estimated value and the current sensed value. One of the current sensed value and the current estimated value to be compared with each other is the monitor phase current sensed value itself, which is not used for the current feedback control, or the value based on the monitor phase current sensed value and hence is not affected by the interference of current feedback control, which hence makes it possible to suitably detect an abnormality of the current sensor. In addition, two requirements of control performance and abnormality detection can be achieved by a minimum number of current sensors. Further, the current sensor for monitoring, which is used for detecting an abnormality of the current sensor, does not need to be disposed for one independent phase. Hence, when compared with the case where a current sensor for monitoring is disposed for one independent phase, a reduction in size and cost can be achieved.

Alternatively, a period of the monitoring stop mode may be changeable according to a monitor phase deviation or a control phase deviation. The monitor phase deviation is a deviation between the monitor phase current estimated value and the monitor phase current sensed value, and the control phase deviation is a deviation between the control phase current estimated value and the control phase current sensed value. Further, the control device may further include: a number-of-revolutions calculation means for calculating the number of revolutions of the alternate current motor based on the rotation angle sensed value; and a number-of-revolutions determination means for determining whether the number of revolutions is not larger than a predetermined determination value. When the number-of-revolutions determination means determines that the number of revolutions of the alternate current motor is not larger than the predetermined determination value, the switching means inhibits the monitoring mode and switches the monitoring mode to the monitoring stop mode.

Alternatively, the control device may further include: a number-of-revolutions calculation means for calculating the number of revolutions of the alternate current motor based on the rotation angle sensed value; and a number-of-revolutions sudden-change determination means for determining whether the number of revolutions is changed within predetermined time. When the number-of-revolutions sudden-change determination means determines that the number of revolutions is changed within the predetermined time, the switching means inhibits the monitoring mode and switches the monitoring mode to the monitoring stop mode.

Alternatively, the control device may further include: a torque sudden-change determination means for determining whether a torque command value relating to a torque generated by the alternate current motor is changed within predetermined time. When the torque sudden-change determination means determines that the torque command value is changed within the predetermined time, the switching means inhibits the monitoring mode and switches the monitoring mode to the monitoring stop mode.

Alternatively, the current calculation means may stop calculating the two-phase control current value in the monitoring mode. The current estimation means stops calculating the one-phase current estimated value for controlling the alternate current motor in the monitoring stop mode, and the other-phase current estimation means stops calculating the monitor phase current estimated value and the control phase current estimated value in the monitoring stop mode.

Alternatively, the current calculation means may stop calculating the two-phase control current value in the monitoring mode. The current estimation means stops calculating the one-phase current estimated value for controlling the alternate current motor in the monitoring stop mode, and restarts calculating the one-phase current estimated value for controlling the alternate current motor at a predetermined timing before the monitoring stop mode is switched to the monitoring mode, and the other-phase current estimation means stops calculating the monitor phase current estimated value and the control phase current estimated value in the monitoring stop mode, and restarts calculating at least one of the monitor phase current estimated value and the control phase current estimated value at a predetermined timing before the monitoring stop mode is switched to the monitoring mode.

Alternatively, the current calculation means may calculate the two-phase control current value in each of the monitoring mode and the monitoring stop mode. The current estimation means calculates the one-phase current estimated value in each of the monitoring mode and the monitoring stop mode, and the other-phase current estimation means calculates at least one of the monitor phase current estimated value and the control phase current estimated value in each of the monitoring mode and the monitoring stop mode.

Alternatively, the current estimation means may calculate the one-phase current estimated value for controlling the alternate current motor by integrating a correction vector on a d-q axis plane. The correction vector is calculated based on a current basic value and the control phase current sensed value, and the current basic value is a control phase component of a previously calculated one-phase current estimated value, which is calculated in a last calculation time. Further, the other phase current estimation means may calculate the monitor phase current estimated value based on the one-phase current estimated value for controlling the alternate current motor. Furthermore, the other phase current estimation means may calculate a one-phase current estimated value for monitoring the alternate current motor based on the monitor phase current sensed value and the rotation angle sensed value. The other phase current estimation means calculates the one-phase current estimated value for monitoring the alternate current motor by integrating a monitor phase correction vector on a d-q axis plane. The monitor phase correction vector is calculated based on a monitor phase current basic value and the monitor phase current sensed value. The monitor phase current basic value is a component of the monitor phase of a previously calculated one-phase current estimated value for monitoring the alternate current motor. The other phase current estimation means calculates the control phase current estimated value based on the one-phase current estimated value for monitoring the alternate current motor.

Alternatively, the current estimation means may calculate the one-phase current estimated value for controlling the alternate current motor based on the current command value relating to a driving of the alternate current motor in addition to the control phase current sensed value and the rotation angle sensed value. Further, the other phase current estimation means may calculate the monitor phase current estimated value based on the current command value in addition to the control phase current sensed value and the rotation angle sensed value. Furthermore, the other phase current estimation means may calculate the control phase current estimated value based on the current command value in addition to the monitor phase current sensed value and the rotation angle sensed value.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for controlling and driving a three-phase alternate current motor, which has an impressed voltage controlled by an inverter, the control device comprising:
   a control phase current acquisition means for acquiring a control phase current sensed value from a control phase current sensor, which is disposed on a control phase as one of three phases of the alternate current motor;
   a monitor phase current acquisition means for acquiring a monitor phase current sensed value from a monitor phase current sensor, which is disposed on a monitor phase as another one of the three phases different from the control phase;
   a rotation angle acquisition means for acquiring a rotation angle sensed value from a rotation angle sensor for sensing a rotation angle of the alternate current motor;
   a current calculation means for calculating a two-phase control current value based on the control phase current sensed value, the monitor phase current sensed value and the rotation angle sensed value;
   a current estimation means for calculating a one-phase current estimated value for controlling the alternate current motor based on the control phase current sensed value and the rotation angle sensed value;
   a voltage command value calculation means for calculating a voltage command value relating to a voltage to be impressed on the inverter based on the two-phase control current value or the one phase current estimated value for controlling the alternate current motor;
   an other phase current estimation means for calculating at least one of a monitor phase current estimated value and a control phase current estimated value, the monitor phase current estimated value being estimated based on the control phase current sensed value and the rotation angle sensed value, and the control phase current estimated value being estimated based on the monitor phase current estimated value and the rotation angle sensed value;
   an abnormality detection means for detecting an abnormality being caused in at least one of the monitor phase current sensor and the control phase current sensor based on at least one of a first comparison result and a second comparison result, the first comparison result being acquired by comparing the monitor phase current estimated value with the monitor phase current sensed value, and the second comparison result being acquired by comparing the control phase current estimated value with the control phase current sensed value; and
   a switching means for switching between a monitoring stop mode, in which the voltage command value is calculated based on the two-phase control current value, and a monitoring mode, in which the voltage command value is calculated based on the one-phase current estimated value for controlling the alternate current motor, and the abnormality detection means detects the abnormality, at predetermined time intervals.

2. The control device according to claim 1,
   wherein a period of the monitoring stop mode is changeable according to a monitor phase deviation or a control phase deviation,
   wherein the monitor phase deviation is a deviation between the monitor phase current estimated value and the monitor phase current sensed value, and
   wherein the control phase deviation is a deviation between the control phase current estimated value and the control phase current sensed value.

3. The control device according to claim 1, further comprising:
   a number-of-revolutions calculation means for calculating the number of revolutions of the alternate current motor based on the rotation angle sensed value; and
   a number-of-revolutions determination means for determining whether the number of revolutions is not larger than a predetermined determination value,
   wherein, when the number-of-revolutions determination means determines that the number of revolutions of the alternate current motor is not larger than the predetermined determination value, the switching means inhibits the monitoring mode and switches the monitoring mode to the monitoring stop mode.

4. The control device according to claim 1, further comprising:
   a number-of-revolutions calculation means for calculating the number of revolutions of the alternate current motor based on the rotation angle sensed value; and
   a number-of-revolutions sudden-change determination means for determining whether the number of revolutions is changed within predetermined time,
   wherein, when the number-of-revolutions sudden-change determination means determines that the number of revolutions is changed within the predetermined time, the switching means inhibits the monitoring mode and switches the monitoring mode to the monitoring stop mode.

5. The control device according to claim 1, further comprising:
   a torque sudden-change determination means for determining whether a torque command value relating to a torque generated by the alternate current motor is changed within predetermined time,
   wherein, when the torque sudden-change determination means determines that the torque command value is changed within the predetermined time, the switching means inhibits the monitoring mode and switches the monitoring mode to the monitoring stop mode.

6. The control device according to claim 1,
   wherein the current calculation means stops calculating the two-phase control current value in the monitoring mode,
   wherein the current estimation means stops calculating the one-phase current estimated value for controlling the alternate current motor in the monitoring stop mode, and
   wherein the other-phase current estimation means stops calculating the monitor phase current estimated value and the control phase current estimated value in the monitoring stop mode.

7. The control device according to claim 1,
   wherein the current calculation means stops calculating the two-phase control current value in the monitoring mode,
   wherein the current estimation means stops calculating the one-phase current estimated value for controlling the alternate current motor in the monitoring stop mode, and restarts calculating the one-phase current estimated value for controlling the alternate current motor at a predetermined timing before the monitoring stop mode is switched to the monitoring mode, and wherein the other-phase current estimation means stops calculating the monitor phase current estimated value and the control phase current estimated value in the monitoring stop mode, and restarts calculating at least one of the monitor phase current estimated value and the control phase current estimated value at a predetermined timing before the monitoring stop mode is switched to the monitoring mode.

8. The control device according to claim 1, wherein the current calculation means calculates the two-phase control current value in each of the monitoring mode and the monitoring stop mode, wherein the current estimation means calculates the one-phase current estimated value in each of the monitoring mode and the monitoring stop mode, and wherein the other-phase current estimation means calculates at least one of the monitor phase current estimated value and the control phase current estimated value in each of the monitoring mode and the monitoring stop mode.

9. The control device according to claim 1, wherein the current estimation means calculates the one-phase current estimated value for controlling the alternate current motor by integrating a correction vector on a d-q axis plane, wherein the correction vector is calculated based on a current basic value and the control phase current sensed value, and wherein the current basic value is a control phase component of a previously calculated one-phase current estimated value, which is calculated in a last calculation time.

10. The control device according to claim 9, wherein the other phase current estimation means calculates the monitor phase current estimated value based on the one-phase current estimated value for controlling the alternate current motor.

11. The control device according to claim 8, wherein the other phase current estimation means calculates a one-phase current estimated value for monitoring the alternate current motor based on the monitor phase current sensed value and the rotation angle sensed value, wherein the other phase current estimation means calculates the one-phase current estimated value for monitoring the alternate current motor by integrating a monitor phase correction vector on a d-q axis plane, wherein the monitor phase correction vector is calculated based on a monitor phase current basic value and the monitor phase current sensed value, wherein the monitor phase current basic value is a component of the monitor phase of a previously calculated one-phase current estimated value for monitoring the alternate current motor, and wherein the other phase current estimation means calculates the control phase current estimated value based on the one-phase current estimated value for monitoring the alternate current motor.

12. The control device according to claim 1, wherein the current estimation means calculates the one-phase current estimated value for controlling the alternate current motor based on the current command value relating to a driving of the alternate current motor in addition to the control phase current sensed value and the rotation angle sensed value.

13. The control device according to claim 12, wherein the other phase current estimation means calculates the monitor phase current estimated value based on the current command value in addition to the control phase current sensed value and the rotation angle sensed value.

14. The control device according to claim 12, wherein the other phase current estimation means calculates the control phase current estimated value based on the current command value in addition to the monitor phase current sensed value and the rotation angle sensed value.

* * * * *